(12) United States Patent
Hsu

(10) Patent No.: US 6,448,701 B1
(45) Date of Patent: Sep. 10, 2002

(54) SELF-ALIGNED INTEGRALLY GATED NANOFILAMENT FIELD EMITTER CELL AND ARRAY

(75) Inventor: David S. Y. Hsu, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/804,641

(22) Filed: Mar. 9, 2001

(51) Int. Cl.[7] .................................................. H01J 1/30
(52) U.S. Cl. ........................ 313/309; 313/336; 313/351; 313/497; 313/311
(58) Field of Search ................................ 313/309, 336, 313/351, 495, 497, 311

(56) References Cited

U.S. PATENT DOCUMENTS

| | | |
|---|---|---|
| 5,266,530 A | 11/1993 | Bagley et al. |
| 5,462,467 A | 10/1995 | Macaulay et al. |
| 5,564,959 A | 10/1996 | Spindt et al. |
| 5,578,185 A | 11/1996 | Bergeron et al. |
| 5,665,421 A | 9/1997 | Bergeron et al. |
| 5,801,477 A | 9/1998 | Macaulay |
| 5,851,669 A | 12/1998 | Macaulay et al. |
| 6,019,658 A | 2/2000 | Ludwig et al. |
| 6,045,678 A | 4/2000 | Morse et al. |
| 6,084,245 A * | 7/2000 | Hsu et al. ................ 313/336 X |
| 6,097,138 A * | 8/2000 | Nakamoto ............... 313/336 X |
| 6,333,598 B1 * | 12/2001 | Hsu et al. ................ 313/309 X |

\* cited by examiner

*Primary Examiner*—Ashok Patel
(74) *Attorney, Agent, or Firm*—John J. Karasek; Rebecca L. Forman

(57) ABSTRACT

The present invention discloses a new field emitter cell and array consisting of groups of nanofilaments forming emitter cathodes. Control gates are microprocessed to be integrally formed with groups of nanofilament emitter cathodes on a substrate. Groups of nanofilaments are grown directly on the substrate material. As a result, the control gates and groups of nanofilaments are self-aligned with one another.

28 Claims, 19 Drawing Sheets

SELF-ALIGNED INTEGRALLY GATED NANOFILAMENT FIELD EMITTER CELL AND ARRAY

BACKGROUND OF THE INVENTION

Field of the Invention

The present invention relates to a field emitter cell and array, in particular, to an integrally gated, self-aligned field emitter cell and array whose cathode is formed of a recently discovered class of materials of nanotubes and nanowires, collectively referred to as nanofilaments.

BACKGROUND OF THE INVENTION

Field emitters arrays (FEAs) are naturally small structures which provide reasonably high current densities at low voltages. Typically, FEAs are composed of emitter cells in the form of conical, pyramidal, or cusp-shaped point, edge or wedge-shaped vertical structures. These cells are electrically insulated from a positively charged extraction gate and produce an electron beam that travels through an associated opening in the positively charged gate.

The typical field emitter structure includes a sharp point at the tip of the vertical structure (field emitter) and opposite an electrode. In order to generate electrons which are not collected at the extraction electrode, but can be manipulated and collected elsewhere, an aperture is created in the extraction electrode. The aperture is larger (e.g., two orders of magnitude) than the radius of curvature for the field emitter.

Consequently, the extraction electrode is a flat horizontal surface containing an extraction electrode aperture for the field emitter. Such an extraction electrode is referred to as the gate electrode. The field emitter is centered horizontally in the gate aperture and does not touch the gate although the vertical direction of the field emitter is perpendicular to the horizontal plane of the gate. The positive charges on the edge of the extraction electrode aperture surround the field emitter symmetrically so that the electric field produced between the field emitter and the gate causes the electrons to be emitted from the field emitter in a direction such that the electrons are collected on an electrode (anode) that is separate and distinct from the gate. The smaller the aperture, i.e., the closer the gate is to the field emitter, the lower the voltage required to produce field emission of electrons.

The sharp point at the tip of the field emitter provides for reduction in the voltage necessary to produce field emission of electrons. As a result, numerous micro-manufacturing techniques have been developed to produce various sharp tip designs. Current techniques include wet etching, reactive ion etching (RIE), and a variety of field emitter tip deposition techniques.

Effective methods generally require the use of lithography which has a number of inherent disadvantages including a high equipment and manufacturing cost. For example, the high degree of spatial registration requires expensive high resolution lithography.

Additionally, cathode structures include very small localized vacuum electron sources which emit sufficiently high current. However, these vacuum electron sources are difficult to fabricate for practical applications. This is particularly true when the sources are required to operate at reasonably low voltages. Presently available thermionic sources do not emit high current densities, but rather result in small currents being generated from small areas. In addition, thermionic sources must be heated, and thus require special heating circuits and power supplies. Photo-emitters have similar problems with regard to low currents and current densities.

Recent advancements in nanotechnology have resulted in the creation of nanofilaments including nanotubes. One such example is carbon nanotubes. These nanotubes behave like metals or semiconductors and can conduct electricity better than copper, transmit heat better than diamond, and are among some of the strongest materials known while being only a few nanometers in diameter. Nanofilaments can have small diameters, ranging down to only a few nanometers. The nanofilaments may be grown to various lengths (e.g., 100–1000 nm) yet their diameter remains uniform. The aspect ratio (length to diameter) is extremely high.

Nanofilaments in the form of nanotubes have a hollow edge which is on the order of a couple of Angstroms thick. The nanotubes may be either single, double, or multiple walled (i.e., one nanotube within a second, third or further nanotube). For a more comprehensive discussion on carbon nanotubes, see "Carbon Nanotubes Roll On," *Physics World*, June 2000, pages 29–53.

Carbon nanotubes have been proposed as excellent candidates for use as field emitter cathodes due to: (1) the extreme sharpness of their edges and the extremely large aspect ratio, which enable the achievement of low operating voltages; (2) the resistance to tip blunting by residual back ion bombardment due to the uniform wall thickness throughout their height; (3) the relative inertness, high mechanical strength and current carrying capacity; and (4) an inherent current-limiting mechanism in the presence of adsorbed water which retards emitter burn out and destruction by arcing, a problem plaguing the present day FEAs. Nanotubes have been demonstrated in use as a cathode in a cathode lighting element in which the carbon-nanotubes act as the field-emitting cathode.

To be effective emitters, the nanofilaments need to be oriented largely perpendicular to the substrate. Recently, this property has been achieved by growing the nanofilaments on substrates under suitable conditions such as by high temperature chemical vapor deposition (CVD) on catalytic surfaces. For example, CVD has been used to form extremely vertical and uniformly grown carbon nanotubes directly above a metal catalyst substrate of patterned and oxidized iron patches. The resulting nanotubes form an ungated clump electrode which provides a stable field emission over the entire test duration of 20 hours.

On the other hand, high emission current from carbon nanotubes oriented parallel to the substrate has also been observed, which can be attributed to defects on the tube sidewalls. Nanotubes in this orientation can be expected to erode more quickly than those oriented perpendicular to the substrate by residual back ion bombardment.

However, these nanofilament electrodes are not gated and thus, have limited practical use as field emitters. In order to use nanofilaments as a field emitter, one must control the operating characteristics of the nanofilaments, i.e., the turning on and off of small selected groups (i.e. clumps) of nanofilament emitters which comprise an array of emitter cells (e.g. pixels). This control is accomplished by providing a gate electrode, whose applied voltage bias controls the turning on, turning off and the field emission current magnitude. In order to enable low voltage operation, it is necessary to provide a control gate in very close proximity to a group of nanofilament emitters.

One proposed method of forming a gated nanofilament field emitter includes pre-positioning a paste layer of the nanotubes separately on a substrate and assembling a control grid gate assembly to the paste layer of nanofilaments. This and other presently available manufacturing techniques (all non-integral) fail to provide practical (e.g., in terms of functional and economical) gating of nanofilaments, e.g., nanotube, field emitters.

One clear disadvantage of this method is that the resulting gated unit tends to be large when compared to integrally formed conventional field emitter cells, which limits the resolution. As a result of the increased emitter-grid gate separation, these grid-gated emitters require a much higher gate voltage (hundreds of volts as compared to tens of volts for integrally gated emitters) for their operation.

An additional disadvantage with presently available carbon nanotube field emitting cathodes is that the grid-type control gates and nanotube cathodes are not self-aligned with one another because the control grid gate is assembled to the nanotubes after a paste layer of nanotubes has already been formed. As a result, the gate current (e.g.: current intercepted by the gate) tens to be very high which can cause overheating. In addition, this approach generally does not provide precise control and operation of the FEA and in particular, precise control of individual cells forming the emitter array, as compared to integrally formed and self-aligned control gate and cathode design.

BRIEF SUMMARY OF THE INVENTION

In accordance with the present invention, a self-aligned, integrally gated nanofilament field emitter cell and array is provided wherein a nanofilament cathode (in the form of a group or "clump" of nanofilaments) and control gate are formed through the microprocessing techniques of the subject invention, thereby self-aligning the nanofilament cathode with the control gate.

According to one aspect of the invention, a field emitter cell is provided which comprises an electrically conductive substrate layer. An insulator layer is disposed directly upon the substrate layer and an electrically conductive gate layer is disposed directly on the insulator layer. An aperture on the gate layer extends through the insulator layer to the substrate layer. A catalyst layer is applied to a surface conductively associated with the substrate layer. Electrically conductive nanofilaments are grown on the catalyst layer. The group of nanofilaments are electrically isolated from the gate. When the field emitter cell is operational, the group of nanofilaments act as a cathode.

In alternate embodiments, the catalyst layer upon which the nanofilaments are grown is applied to top surfaces of various structures which comprise a post structure, a tip structure, and an obelisk structure extending from the substrate surface.

One advantage of the present invention is that a field emitter cell is provided in which the cathode comprising a group of nanofilament emitters in close proximity to a control gate (electrodes). As a result of this close proximity, in conjunction with the extreme nanofilament tip sharpness, the control gate electrodes use a much lower emitter operating voltage as compared with currently demonstrated nanofilament grid-gate or ungated field emitter designs.

Yet, another advantage of the present invention is the resistance of the nanofilaments to blunting by residual back ion bombardment because the edge will remain at the same sharpness due to the uniform thickness throughout their heights. Yet, another advantage of the present invention is that the carbon nanotube has a relatively clean and inert surface (i.e. no non-volatile oxides), which enhances higher emission stability. Another advantage is that often these nanofilaments either possess or can be tailored to posses significant resistance which, during emission, will lead to an IR (current times resistance, from the equation V=IR where V=voltage, I=current, and R=resistance) drop in the potential between the gate and the emitter, thereby preventing emitter burn-out by limiting the current. Further, carbon nanotubes, in the presence of adsorbed water, provide an inherent current-limiting mechanism which tends to retard emitter burn-out as disclosed in "Current Saturation Mechanisms In Carbon Nanotube Field Emitters," *Applied Physics Letters*, volume 76, no. 3, Kenneth A. Dean and Babu R. Chalamala, Jan. 17, 2000, herein incorporated by reference.

It is an object of the present invention to provide a self-aligned integrally gated nanofilament field emitter cell and array.

It is an another object of the present invention to provide a integrally gated (but not necessarily self-aligned) nanofilament field emitter cell and array.

It is another object of the present invention to provide a field emitter cell and array in which the gate electrode is placed in very close proximity to a group of nanofilament emitters.

It is yet another objective of the present invention to provide a field emitter cell and array in which the cathode is resistant to blunting and surface contamination.

It is yet another object of the present invention to provide a field emitter cell and array with a very low turn-on voltage and that has a stable field emission.

It is yet another object of the present invention to provide a field emitter cell and array that is very economical to manufacture because no precise lithography is required. In fact, when using the method of the present invention, no lithography is required in making the field emitter cell and array if a stamping technology is used to make the masks for the etching of the starting apertures.

Further features and advantages of the present invention are set forth in, or apparent from, the description of preferred embodiments which follows.

DETAILED DESCRIPTION OF THE INVENTION

1st Embodiment

Figure 1A:
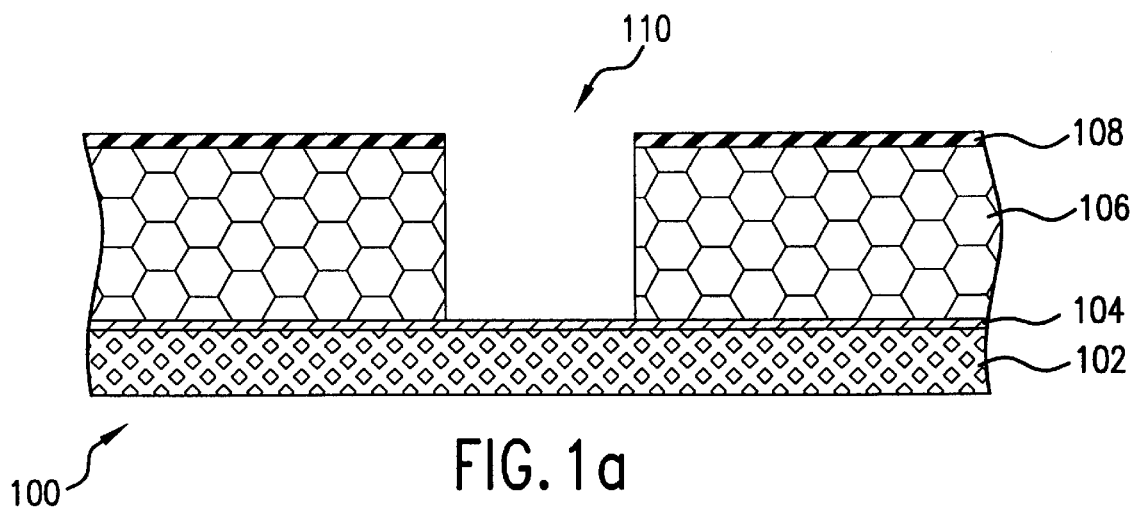
FIGS. 1(a)–1(g) illustratively depicts the processing steps involved in fabricating a field emitter according to a first embodiment of the present invention.

Referring now to FIGS. 1(a)–1(g), illustratively depicted therein are the steps of fabricating a field emitter cell 100 according to the first embodiment of the present invention. The field emitter cell 100 is formed on a conductive or semiconductive substrate layer 102. Optimally, substrate layer 102 is a porous silicon substrate with a nanoporous layer in order to provide for highly directional nanotube growth.

A catalyst layer 104 is deposited on substrate layer 102 by sputtering or evaporative deposition of a suitable catalyst material. The catalyst layer promotes the growth of nanofilaments of interest under appropriate growth conditions (described below). For carbon nanotube growth, the most effective catalyst layer may comprise iron, nickel or cobalt.

Optionally, at this point, the catalyst-coated substrate may be annealed in air to anneal and oxidize the catalyst layer 104. Alternatively, the annealing/oxidation of catalyst layer 104 may be done later or it may be left unoxidized. Insulator layer 106, composed of $SiO_2$ or other suitable insulator material, is deposited to a few thousand Angstroms thick.

Gate layer 108 is then deposited on insulator layer 106. Gate layer 108 is composed of either a semiconducting material, a metal, or a multiple layer conductive material that does not catalyze nanofilament growth. For example, the material of gate layer 108 may comprise two layers including a chromium layer on a p-type polysilicon layer deposited over the insulator layer 106.

Gate aperture 110 is formed by patterning and etching using any of a number of techniques known in the art such as the one described in the commonly-owned U.S. Pat. No. 6,084,245, herein incorporated by reference. For example, circular posts of resist (not shown) are patterned and fabricated on the gate layer 108 followed by evaporation deposition of a thin chromium layer and then lift-off of the resist post to leave patterned circular apertures in the chromium layer (not shown). Using the chromium layer as an etch mask, standard reactive ion etching (RIE) is used to anisotropically etch aperture 110 through gate layer 108 and insulator layer 106, terminating on the catalyst layer 104.

Figure 1B:
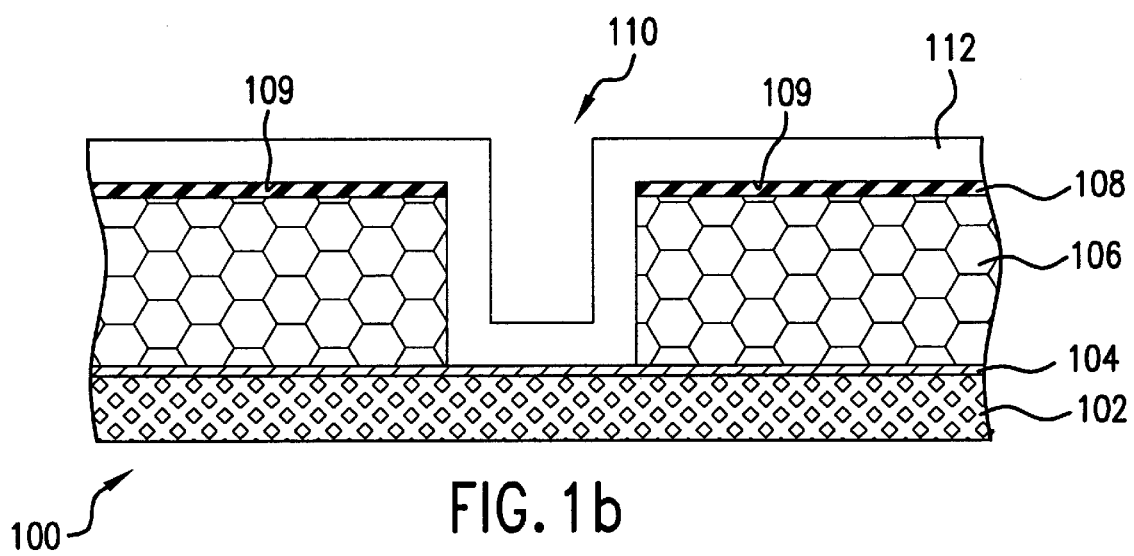
Figure 1C:
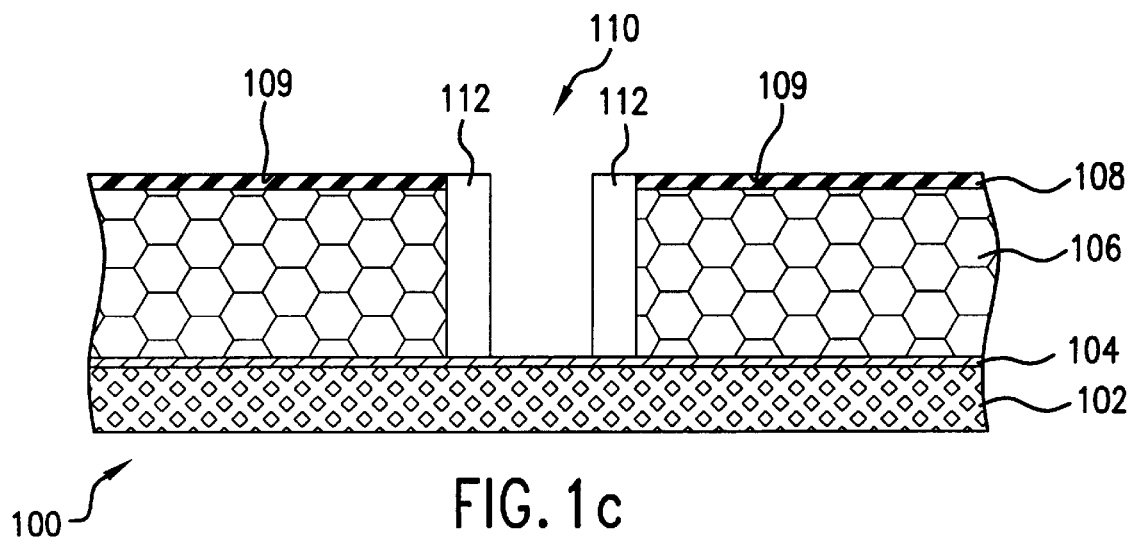

Referring now to FIG. 1(b), preferably a CVD method is used to deposit a conformal, stand-off layer 112 on the horizontal surfaces 109 of gate layer 108 and along the vertical sides of gate layer 108 and insulator layer 106 and the horizontal surface of catalyst layer 104 exposed during the etching of aperture 110. The thickness of stand-off layer 112 is adjusted to reduce the diameter of aperture 110. Referring now to FIG. 1(c), standard anisotropic RIE of the stand-off layer is carried out to remove the stand-off layer 112 disposed on the horizontal surface 109 of gate layer 108. In addition, RIE removes stand-off layer 112 deposited at the bottom of aperture 110, thereby exposing catalyst layer 104.

If catalyst layer 104 was not previously annealed and oxidized prior to stand-off layer 112 deposition, cell 100 is optionally annealed in air at a temperature to substantially oxidize the exposed catalyst layer 104 as previously described.

Figure 1D:
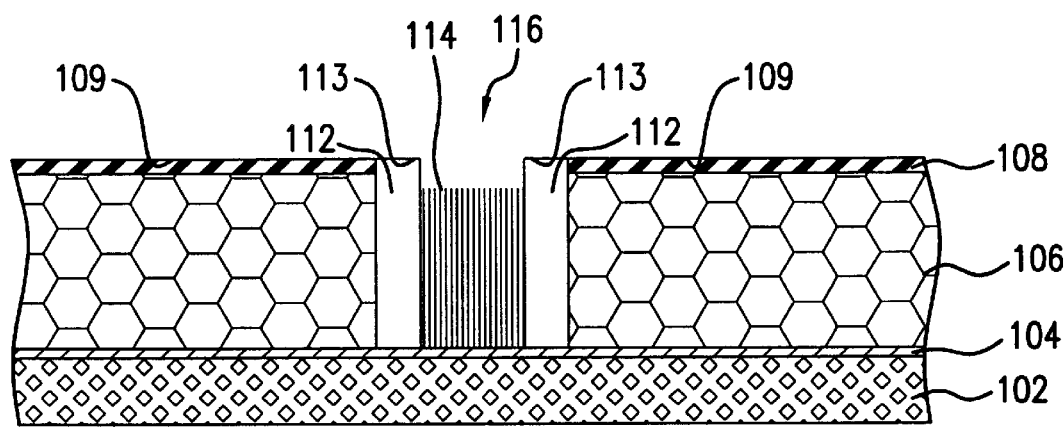

Referring now to FIG. 1(d), nanofilaments are grown on top of the exposed catalyst layer 104 disposed at the bottom of gate aperture 110. Nanofilaments 114 are grown, preferably, perpendicular to and in selective areas over the catalyst surface 104 using growth conditions known in the art, such as those described in connection with the method discussed in *Science*, Vol. 283, 512 (1999) by S. Fan et al., herein incorporated by reference.

Nanofilaments 114, composed of carbon nanotubes, initiate growth on the iron/iron oxide particles that form catalyst layer 104. Optimally, the nanofilaments 114 are grown to the level of gate layer 108 or slightly below, although they may also be at a higher level than the gate layer 108.

Nanofilaments 114, composed of carbon nanotubes, should be grown under conditions that do not form non-nanofilament carbonaceous material on surfaces that do not contain a catalyst. For example, a low hydrocarbon-to-reducing gas ratio should be used in a CVD method.

If needed, cleaning/clearing debris from the top surfaces of field emitter cell 100 such as horizontal surfaces 109 and the horizontal surface 113 of stand-off layer 112, may be accomplished by first filling gate aperture 110 with a protective layer such as a resist or silicon dioxide, followed by perpendicular RIE using oxygen to remove any carbonaceous layer and to etch away the top surface until the residual debris layer is removed.

Figure 1E:
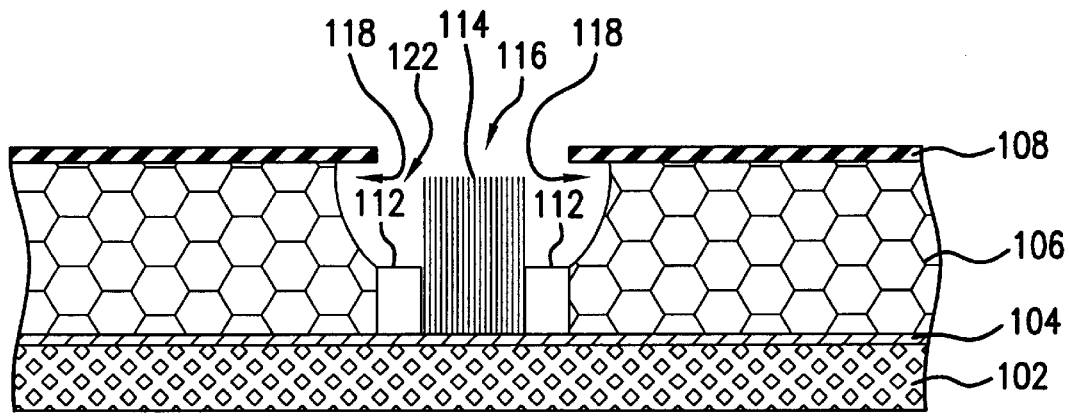

Referring now to FIG. 1(e), field emitter cell 100 is optionally dipped in a buffered hydrofluoric (HF) solution to remove the upper portion of stand-off layer 112. The hydrofluoric acid removes a portion of the stand-off layer 112 along with cutting into (i.e., removing) a portion of insulator layer 106 adjacent nanofilament clump electrode 116 in areas 118. The hydrofluoric acid is removed by gentle rinsing or weak sonication in distilled water.

Optimally, residual water in the cells is removed through a process of freeze-drying. During the freeze-drying, residual water is removed by sublimation. The freeze-drying minimizes the sticking of the individual nanofilaments 114 to the sidewall(s) of the aperture after a wet treatment. An alternative method of drying is by critical point drying, a technique commonly used to preserve mechanical integrity of biological specimen, in which the water is first replaced with a solvent which is then replaced with a liquefied gas (e.g., carbon dioxide). Minimum distortion occurs upon vaporization of the liquefied gas.

A portion of unanchored or weakly anchored nanofilaments 114 may be dislodged during the hydrofluoric acid and water rinse. Mechanical and electrical anchoring of the remaining attached nanofilaments to the FEA 100, can be enhanced by electroplating with nickel at the base where the nanofilaments 114 meet catalyst layer 104.

Figure 1F:
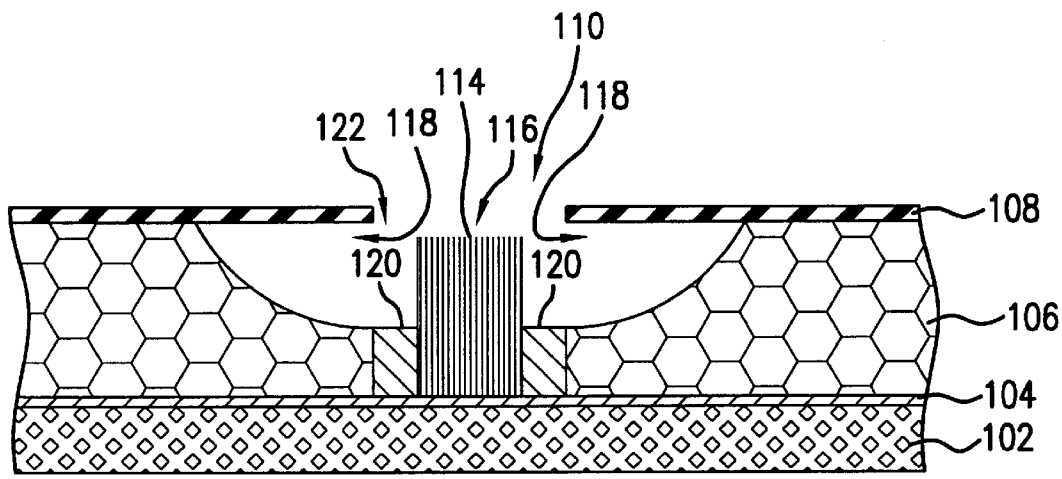

Referring now to FIG. 1(f), if nickel plating is desired, a sufficiently long hydrofluoric acid dip/rinse is first conducted to remove stand-off layer 112 from within aperture 110, thereby exposing catalyst layer 104. Subsequently, nickel 120 is plated up from the freshly exposed portions of the catalytic layer 104 at the bottom of aperture 110.

An alternative to the afore-mentioned HF treatment to remove the top portion of the stand-off layer 112 is by dry etching such as reactive ion etching, thereby avoiding the problem of stiction which would cause the nanofilaments to stick to the sidewalls of the aperture after a wet treatment.

Figure 1G:
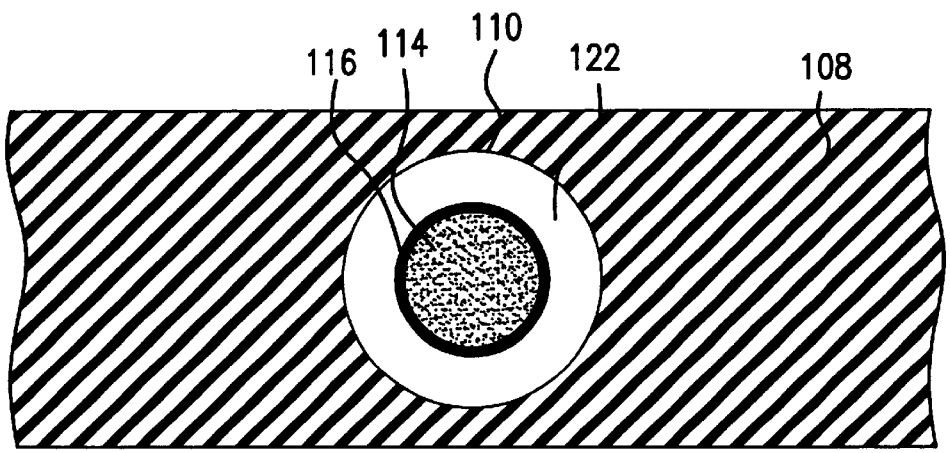

Referring now to FIG. 1(g), along with FIGS. 1(e) and 1(f), the resulting field emitter 100 has a gate layer 108 with a circular gate aperture 110. Clump electrode 116 forms the emitter portion consisting of a group of nanofilaments 114 with circular symmetry centered within gate aperture 110.

Vacuum gap 122 is disposed between the top portion of clump cathode 116, insulator layer 106, and the edge of the gate aperture 110, electrically isolating the nanofilament emitters from the gate. Electrical contact is established between the clump cathode 116, substrate 102, and any layers there between.

Operation of field emitter cell 100 involves the application of a positive voltage bias to the gate layer 108 relative to the clump cathode 116 to extract field emission of electrons from the clump cathode 116. Electrons may be collected on an anode (not shown) placed at a distance above the field emitter array device 100.

Many modifications may be made to this first embodiment to accommodate various manufacturing processes and operating conditions. For example, although nanofilaments 114 are composed of carbon nanotubes, alternate nanofilaments may be nanowires composed of Si, Ge, SiC, GaAs, GaP, InAs, InP, ZnS, ZnSe, CdS, CdSe, $MoS_2$, $WS_2$, and combinations thereof grown under appropriate growth conditions known in the art.

In addition, although clump cathode 116 is formed as a circular group of nanofilaments 114, other geometrical shape may be substituted, such as but not limited to, linear, square, and rectangular (not shown) by making appropriately modifications to the method described above. As is obvious to one of ordinary skill in the art, the placement and shape of the starting template structures (e.g. aperture) on the substrate determines the location and shape of resulting emitter cathodes, cells, and array.

2nd Embodiment

FIGS. 2(a)–2(g) there is illustratively depicted a second embodiment which differs from the first embodiment in that in the second embodiment, catalyst layer 204 is deposited after gate layer 208 and stand-off layer 212 is deposited and etched. Therefore, the various processing steps of the second embodiment are the same as in the first embodiment unless otherwise noted.

Insulator layer 206 is deposited directly on substrate layer 202 by any suitable manner known in the art. Subsequently, gate layer 208 is formed on insulator layer 206, and gate aperture 210 is patterned and etched. Stand-off layer 212 is deposited along the surface of cell structure 200 which includes along the gate layer horizontal surface 209, the vertical wall surfaces within gate aperture 210 and along surface 203 of substrate 202 exposed during the etching of gate aperture 210 (FIG. 2(b)). Next, stand-off layer 212 is removed from the horizontal surfaces of cell structure 200, namely gate layer horizontal surface 209 and substrate surface 203, using an anisotropic RIE (FIG. 2(c)).

Catalyst layer 204 is directionally deposited along surface 203, and along the horizontal surface 209 of gate layer 208. In addition, some catalyst material may be residually deposited along the vertical wall surfaces within gate aperture 210 (FIG. 2(d)). Catalyst layer 204 may be composed of the same material as in the first embodiment. Optimally, the material of gate layer 208 passivates the material of catalyst layer—that is, under the nanofilament growth conditions, the catalyst layer on such a gate material no longer catalyze growth of nanofilaments. However, it is not necessary for the material of gate layer 208 to passivate the catalyst in this $2^{nd}$ embodiment.

Catalyst material deposited on gate layer 208 and the top portion of the vertical side wall of stand-off layer 212 is removed while leaving catalyst layer 204 intact at the bottom of gate aperture 210 on substrate surface 203. Two methods may be used to accomplish this. The catalyst layer 204 at the bottom of gate aperture 210 is protected by first spinning a resist layer 224 over the field emitter 200 (FIG. 2(d)). Next, isotropic etching with oxygen plasma or anisotropic oxygen RIE removes most of the resist layer 224 except for a portion on top of catalyst layer 204 at the bottom of gate aperture 210. Subsequently, acid dissolution removes catalyst layer 204 from all surfaces not protected by resist 224 (FIG. 2(e)).

Alternatively, rather than depositing resist layer 224 followed by isotropic etching using oxygen plasma, catalyst layer 204 may be selectively removed from all surfaces except from the bottom of aperture 210 by glancing angle sputtering.

Figure 2A:
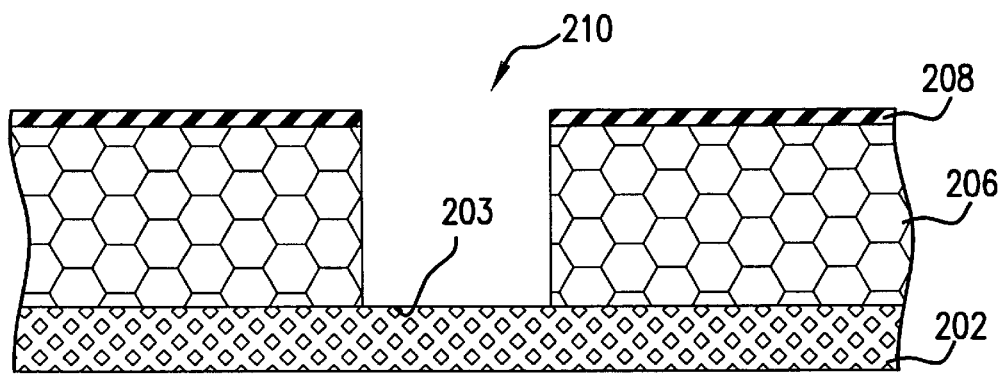
FIGS. 2(a)–2(g) illustratively depicts the processing steps involved in fabricating a field emitter cell according to a second embodiment of the present invention.
Figure 2B:
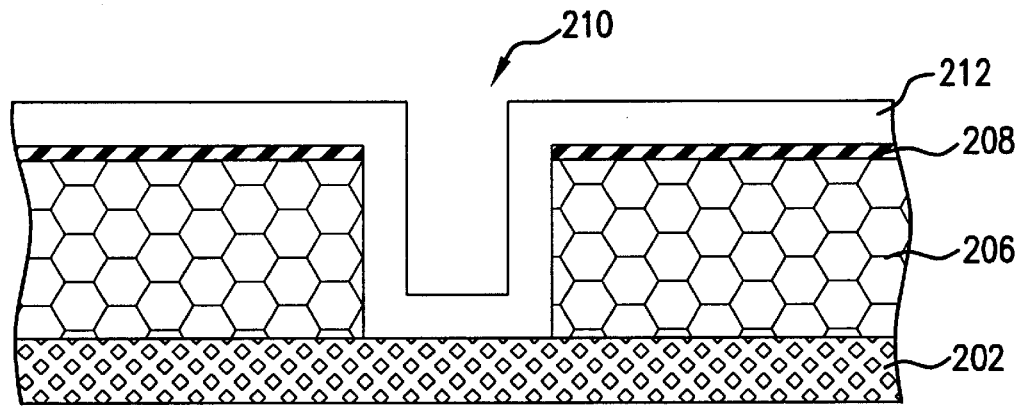
Figure 2C:
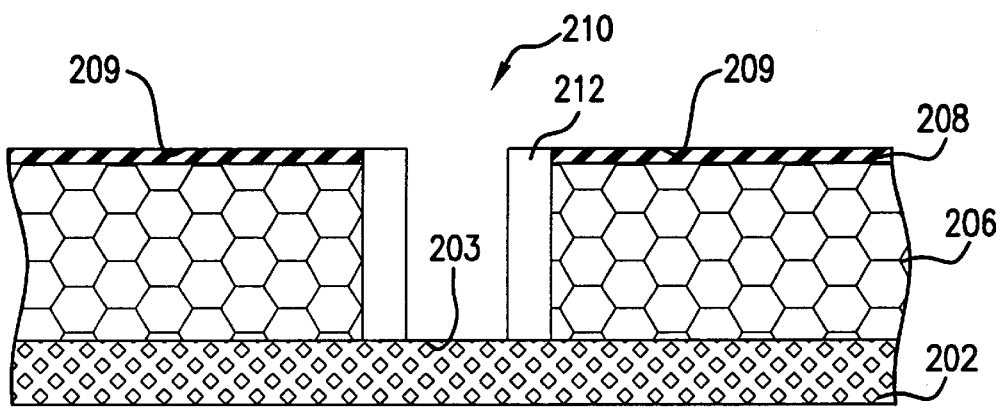
Figure 2D:
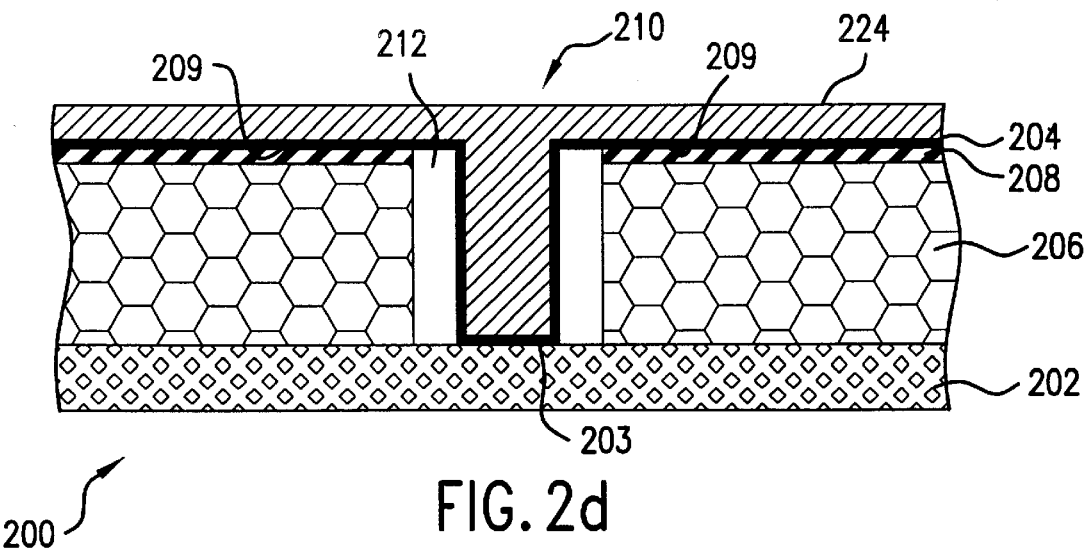
Figure 2E:
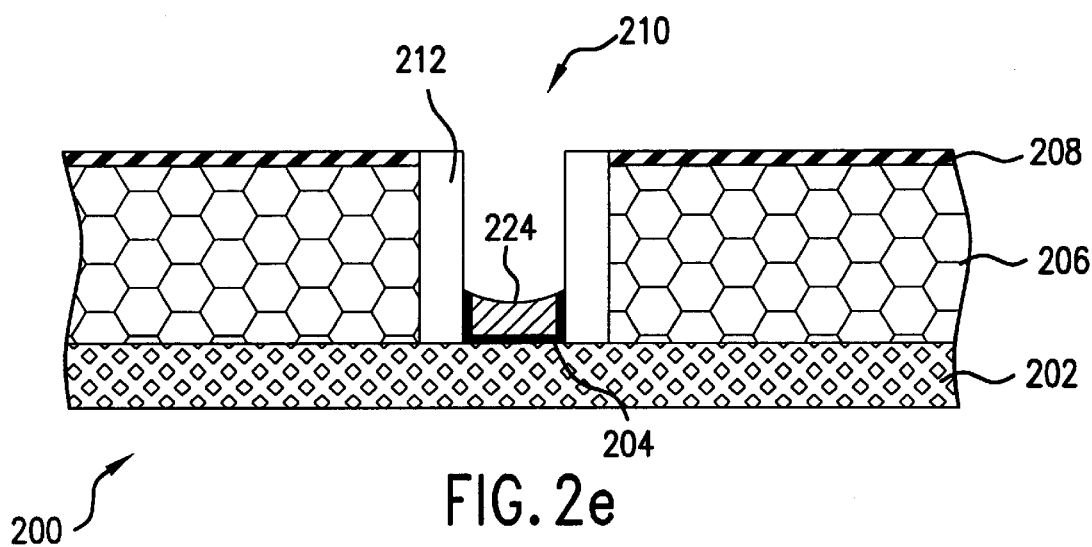
Figure 2F:
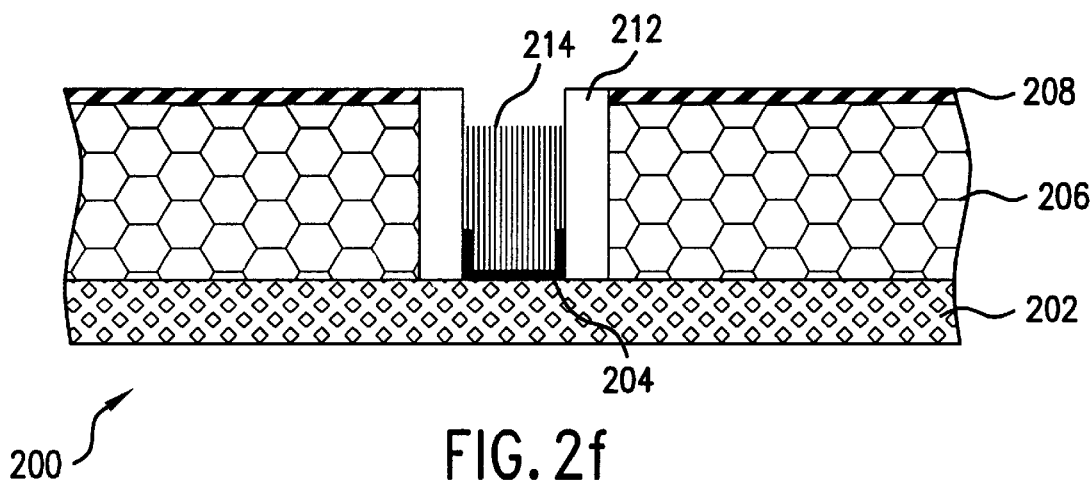
Figure 2G:
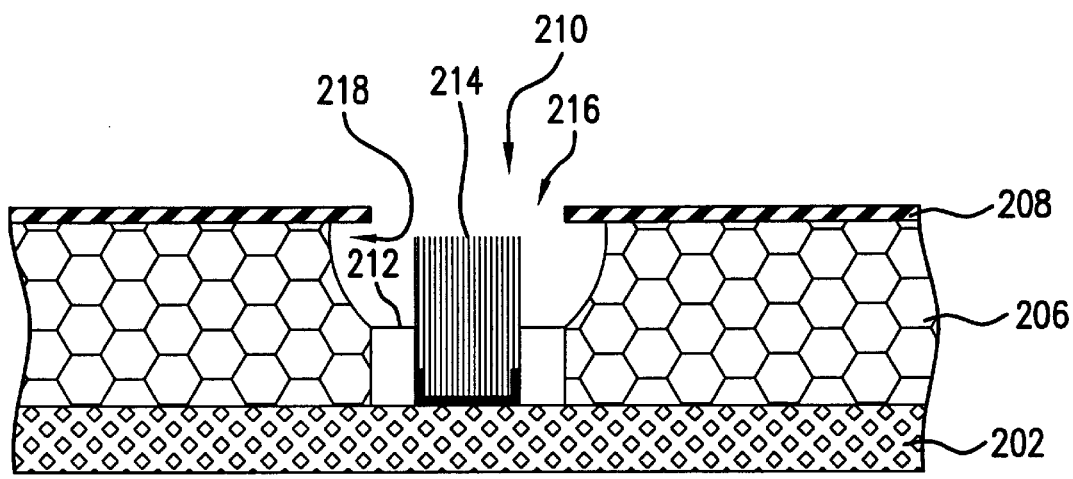

Nanofilaments 214 are grown (FIG. 2(f)) and field emitter 200 is then dipped in hydrofluoric acid, rinsed in water, and freeze-dried (FIG. 2(g)). The hydrofluoric acid rinse removes the upper (i.e., top) portion of stand-off layer 212 and undercuts insulator layer 206 in area 218. As with the first embodiment, the base of clump cathode 216 between nanofilaments 214 and the side-wall of aperture 210 may be optionally reinforced as described above. Alternatively, the upper portion of standoff layer 212 can be removed by dry etching, which least disturbs the nanofilaments.

3rd Embodiment

Figure 3A:
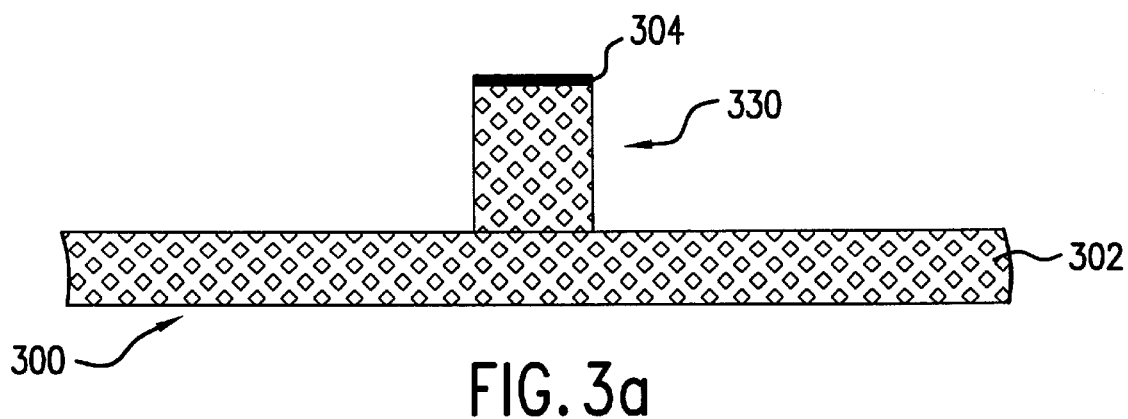
FIGS. 3(a)–3(g) illustratively depicts the processing steps involved in fabricating a field emitter cell according to a third embodiment of the present invention in which the emitter cathode comprises a group of nanofilaments formed on a post structure.

Referring now to FIGS. 3(a)–3(g), in a third embodiment, the starting substrate upon which the nanofilaments are grown is a post structure 330. Referring now specifically to FIG. 3(a), post 330 is formed by patterning and reactive ion etching (RIE) a starting material of nanoporous silicon layer substrate 302 with catalyst layer 304. The patterning and RIE are standard microelectronic fabrication methods known in the art. Catalyst layer 304 is optionally oxidized in the same manner as in the earlier described embodiments.

Figure 3B:
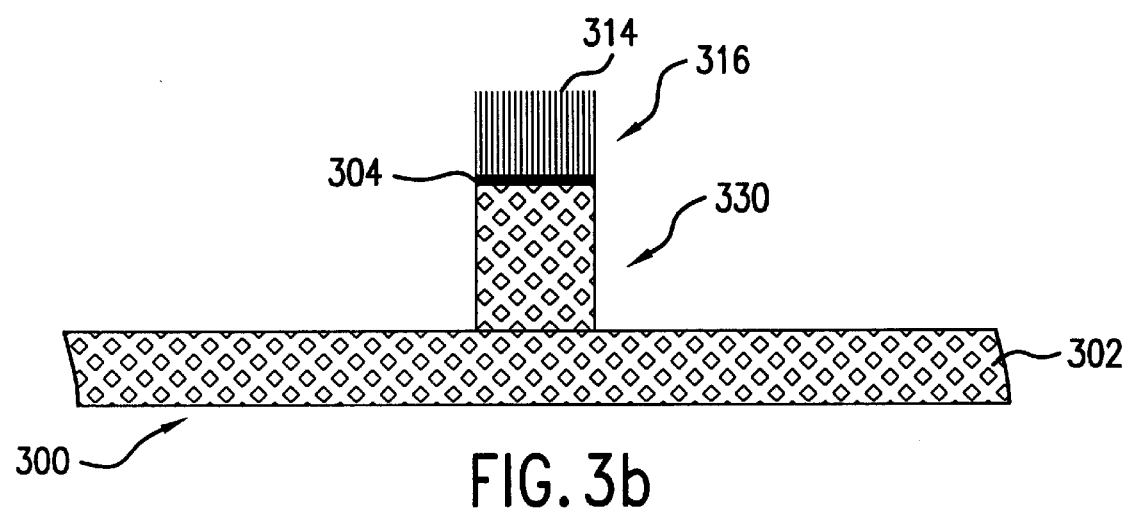
Figure 3C:
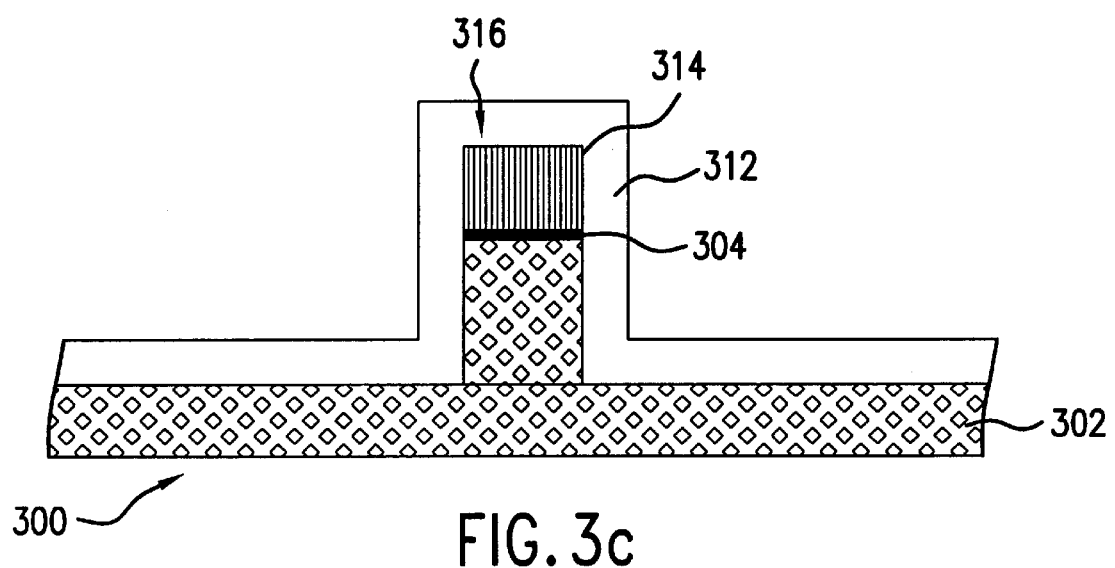

Nanofilaments 314 are preferably carbon nanotubes that are grown on top of post 330 under the same conditions as in the previous embodiments, resulting in clump cathode 316 (FIG. 3(b)). A conformal stand-off layer 312 composed of silicon nitride, silicon dioxide or tungsten, is deposited over the entire cell structure 300 structure (FIG. 3(c)).

Figure 3D:
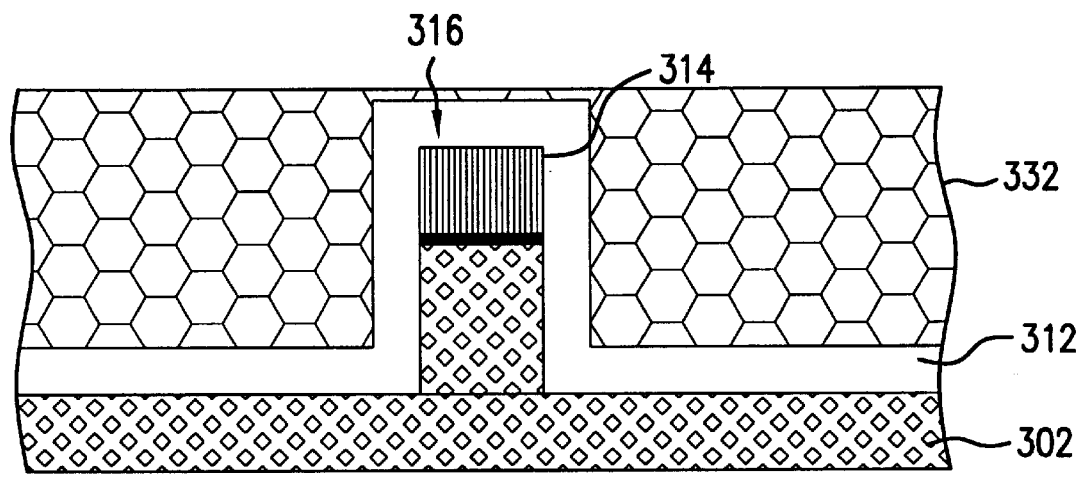

Referring now to FIG. 3(d), planarization layer 332 is deposited over cell structure 300 along the top of stand-off layer 312. Planarization layer 332 is composed of a suitable insulator material such as silicon dioxide or spin-on glass of a different insulator material than that of stand-off layer 312. Standard planarization techniques such as chemical-mechanical-polishing (CMP) is performed on planarization layer 332 (FIG. 3(d)).

Figure 3E:
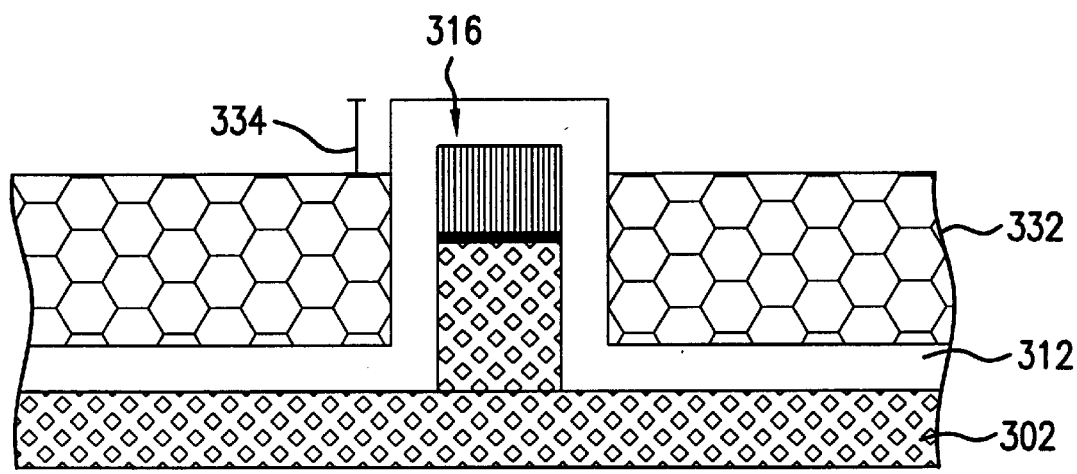

Selective directional RIE is used to etch back planarization layer 332 to a desired height 334 below the top of stand-off layer 312 without etching the stand-off layer 312 (FIG. 3(e)). The desired height 334 determines the placement of the control gate relative to clump cathode 316.

Figure 3F:
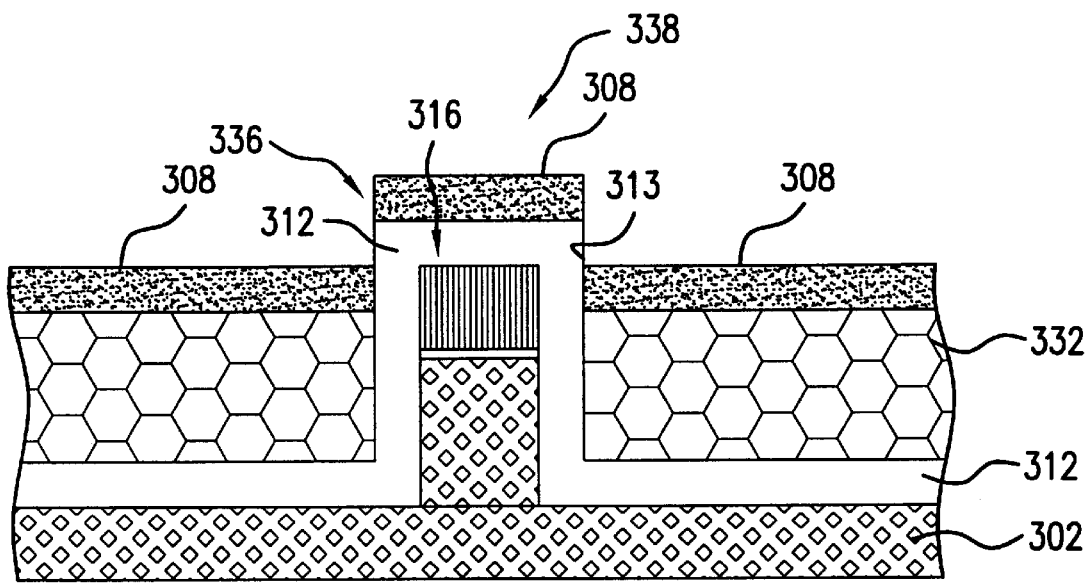
Figure 3G:
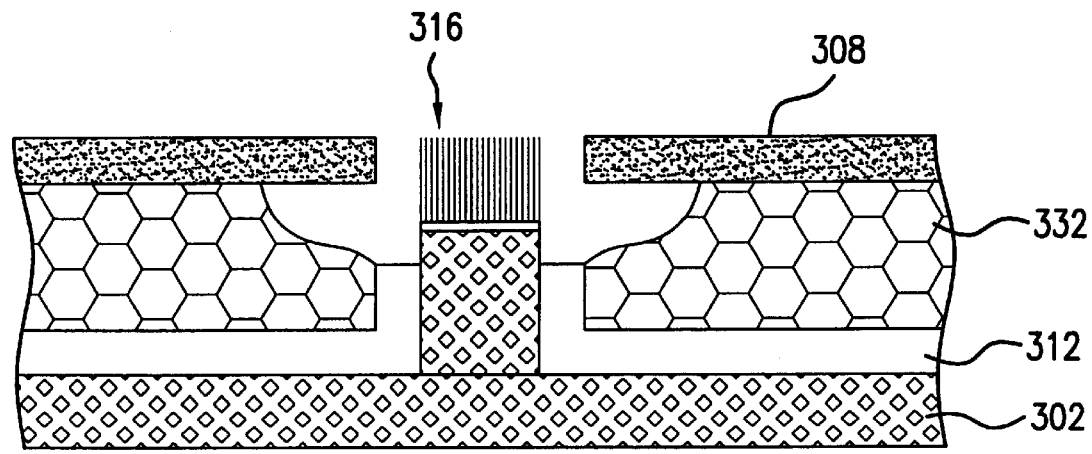

Referring now to FIG. 3(f), gate metalization material is directionally evaporated on top of planarization layer 332 to form gate layer 308, and on the horizontal surface of stand-off layer 312 to form metalization cap 338. Care should be taken such that gate metalization material is not deposited on the vertical portions 313 of stand-off layer 312. If necessary, a short etch may be used to remove any material inadvertently deposited on the vertical portions 313 of stand-off layer 312.

Wet etch (such as by HF) or isotropic dry etch is carried out to remove the top portion 336 of stand-off layer 312. The wet etch or isotropic dry etch also removes metalization cap 338 as well as removing a portion of stand-off layer 312 below metalization cap 338, recessing stand-off layer 312 sufficiently below the top of clump cathode 316 (FIG. 3(g)). If a wet etch is used, freeze-drying is used to remove the residual liquid.

4th Embodiment

Referring now generally to FIGS. 4(a)–4(i), a fourth embodiment is shown which represents a modification of the processing method of the third embodiment. In the fourth embodiment, a catalyst layer 404 is deposited on post 430 after gate layer 408 is formed.

Figure 4A:
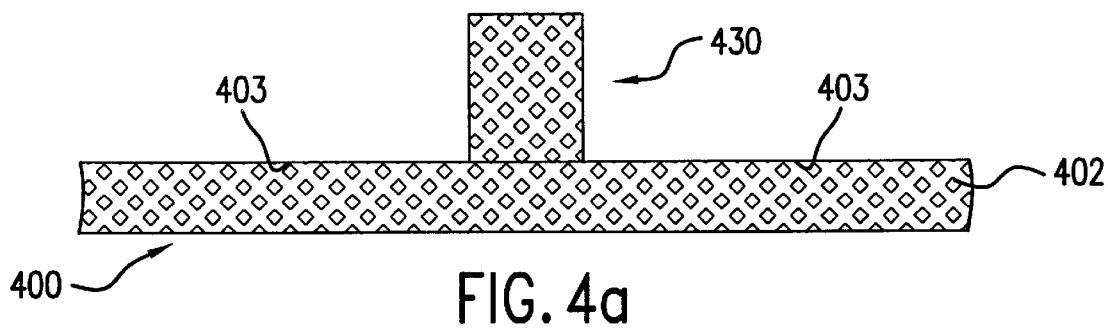
FIGS. 4(a)–4(i) illustratively depicts the steps involved in fabricating the field emitter cell according to a fourth embodiment of the present invention in which the emitter cathode comprises a group of nanofilaments formed on a post structure.
Figure 4B:
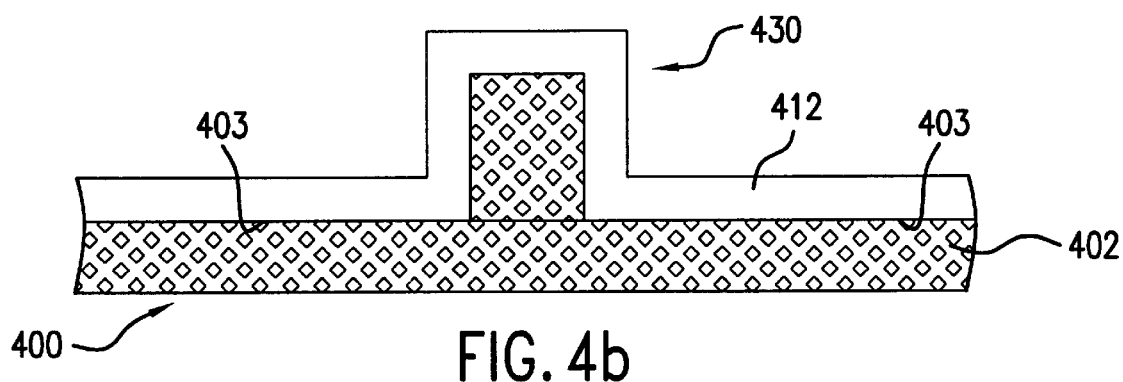
Figure 4C:
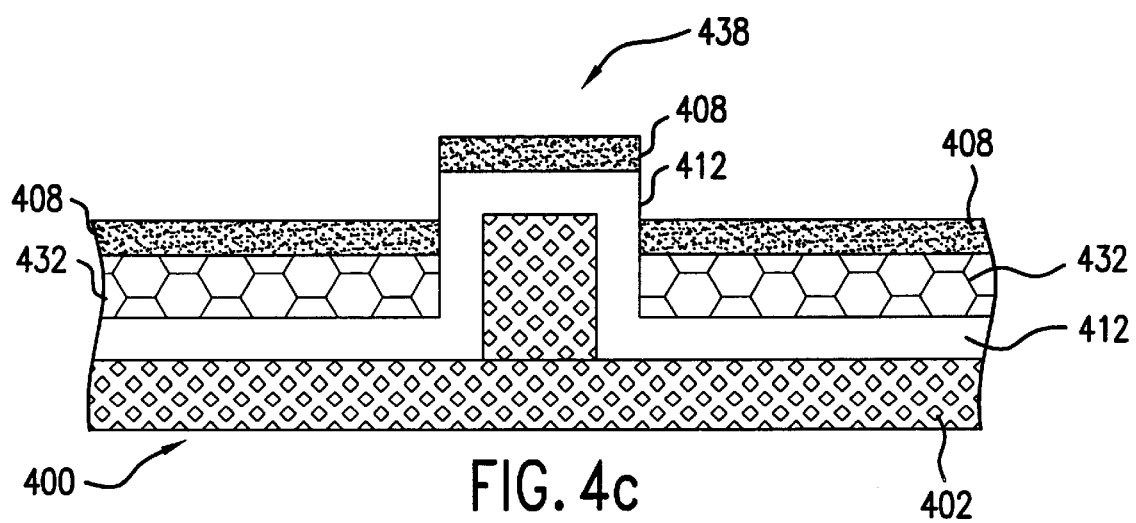
Figure 4D:
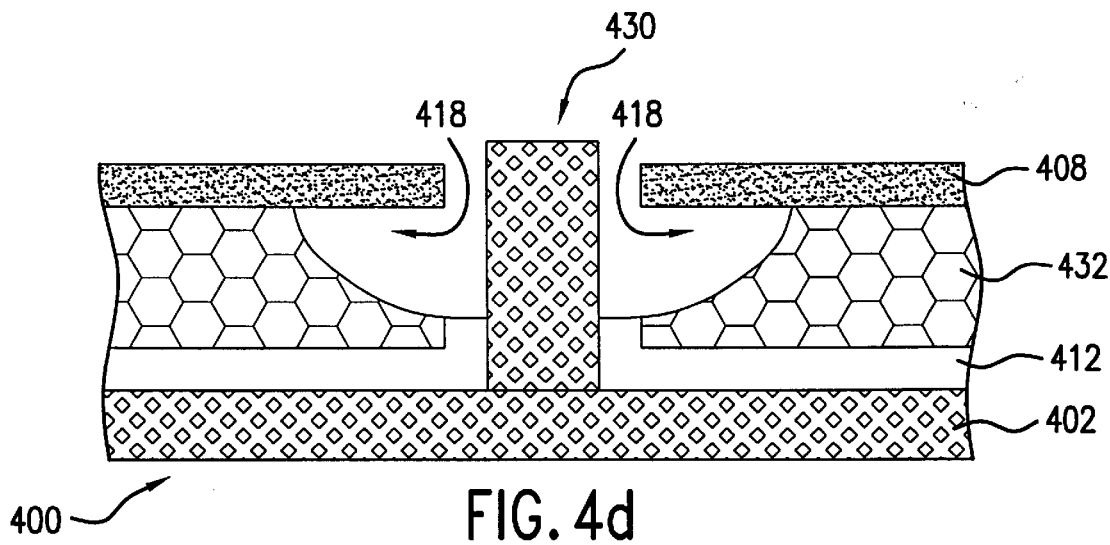

Referring specifically now to FIG. 4(a), post 430 is formed in a similar manner as post 330 with the exception that the starting structure is a post structure 430 on top of substrate 402 without a catalyst layer formed thereon. A silicon dioxide ($SiO_2$) stand-off layer 412 is thermally grown (in case if the post and substrate are made of silicon) or deposited over cell structure 400 including the horizontal surfaces 403 of substrate 402 and horizontal and vertical surfaces of post 430 (FIG. 4(b)). Subsequently, planarization layer 432, composed of $SiO_2$, gate layer 408 and metalization cap 438 are formed as in the third embodiment (FIG. 4(c)). A wet etch in buffered HF or isotropic dry etch removes the metalization cap 438, the top portion of the stand-off layer and undercuts planarization layer 432 in areas 418 (FIG. 4(d)).

Figure 4E:
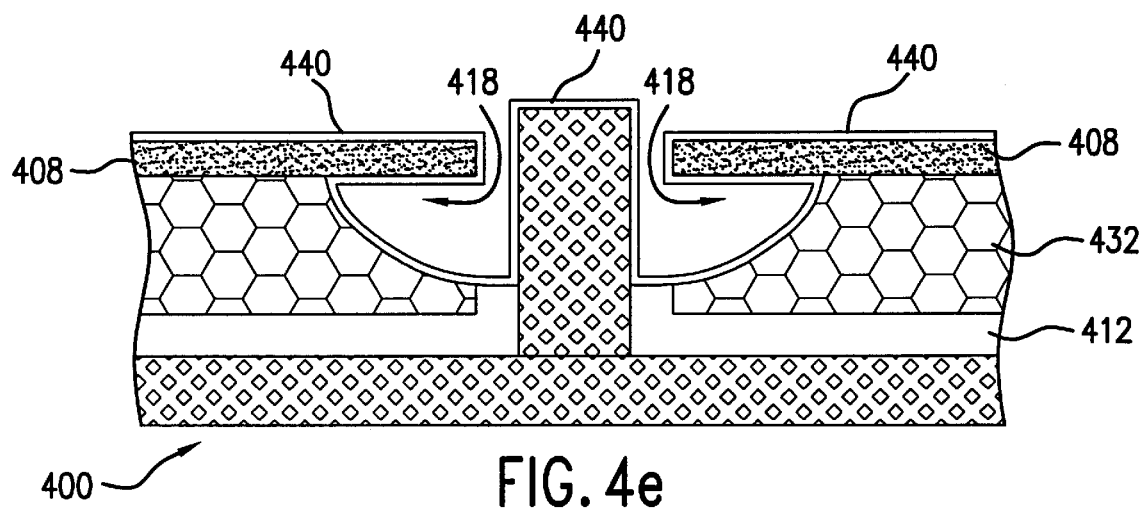
Figure 4F:
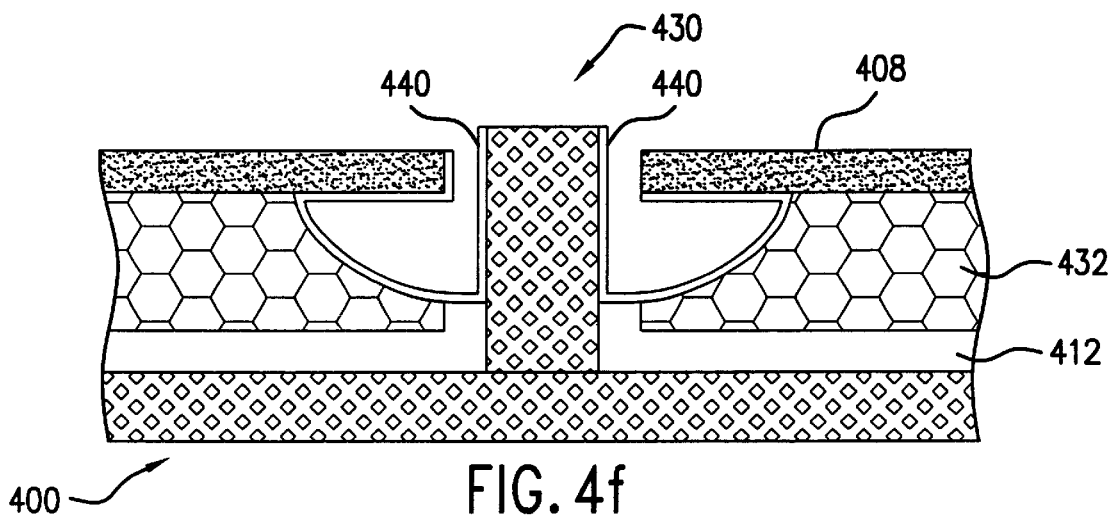

A thin, conform CVD silicon dioxide forms sacrificial layer 440 (FIG. 4(e)) over all surfaces of the cell. Next, directional RIE is used to remove sacrificial layer 440 from the top of post 430 and the top of gate layer 408 while leaving the vertical sides of post 430 covered with the CVD silicon oxide sacrificial layer 440 (FIG. 4(f)).

Figure 4G:
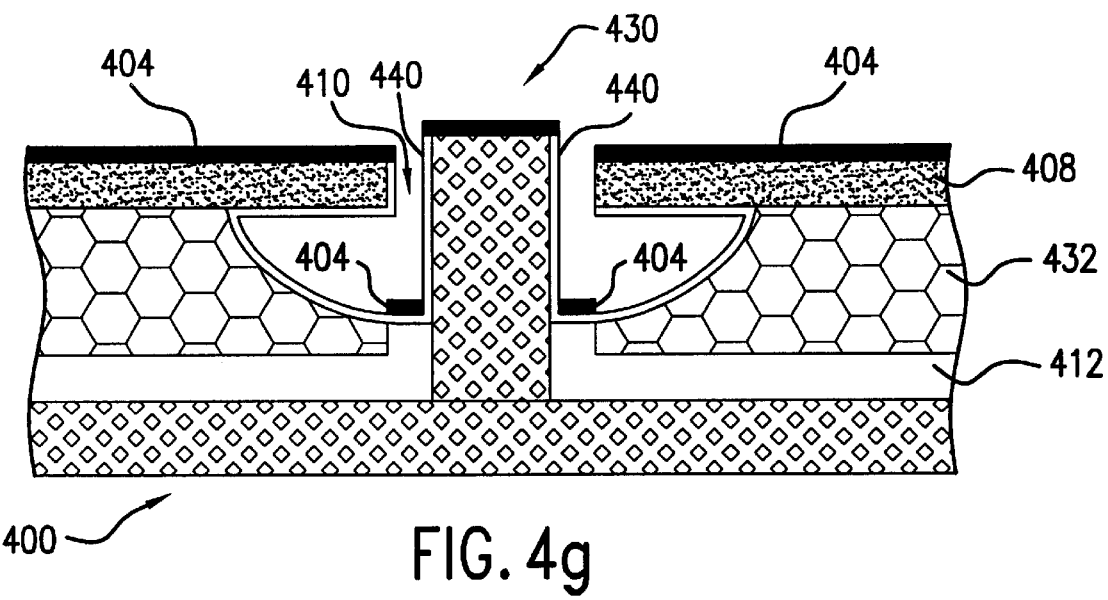

Referring now to FIG. 4(g), catalyst layer 404, such as nickel (Ni) which is relatively resistant to reaction with HF is directionally deposited by sputtering or evaporation on the top surfaces of cell structure 400 which include on top of post 430 and gate layer 408, as well as residually in gate aperture 410 along conformal sacrificial oxide layer 440. Optimally, under nanotube growth conditions, the material of gate layer 408 should alloy with the material of catalyst layer 404, or in the alternative, material of gate layer 408 should passivate the material of catalyst 404, thereby preventing nanofilament growth on gate layer 408. For example, the gate material may be chromium (Cr) which passivates Ni.

Figure 4H:
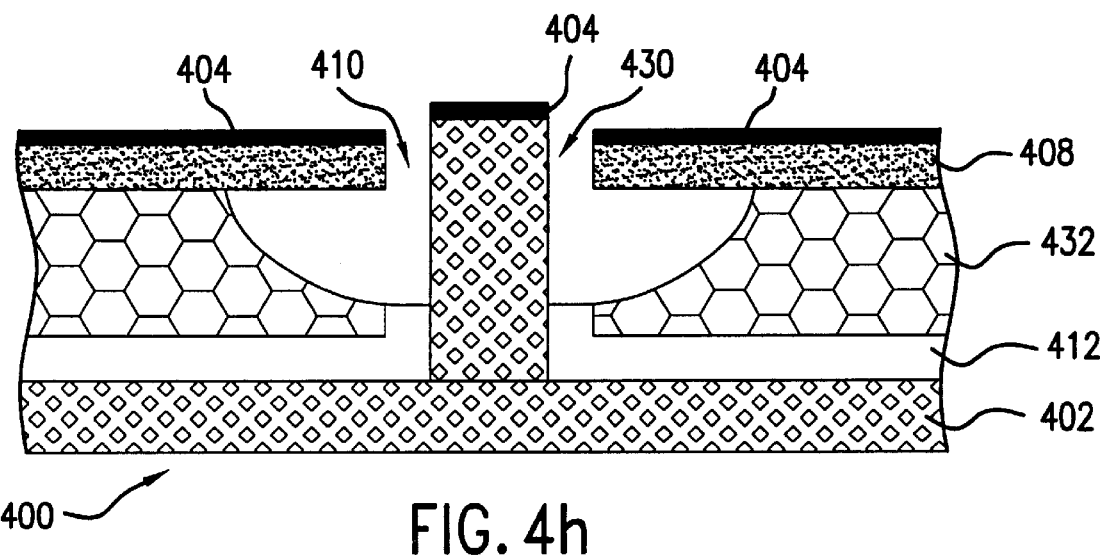

The field emitter 400 is briefly dipped in a dilute buffered HF solution to remove (i.e., lift off) any catalyst material which may lie on top of the sacrificial silicon dioxide layer 440 in gate aperture 410 (FIG. 4(h)). The hydrofluoric acid removes both the unwanted catalyst present in aperture 410 as well as CVD silicon dioxide sacrificial layer 440 present in aperture 410 along the vertical wall surfaces of post 430 and along planarization layer 432 and gate layer 408. A significant amount of catalyst should remain on the top surface of the post 430.

Figure 4I:
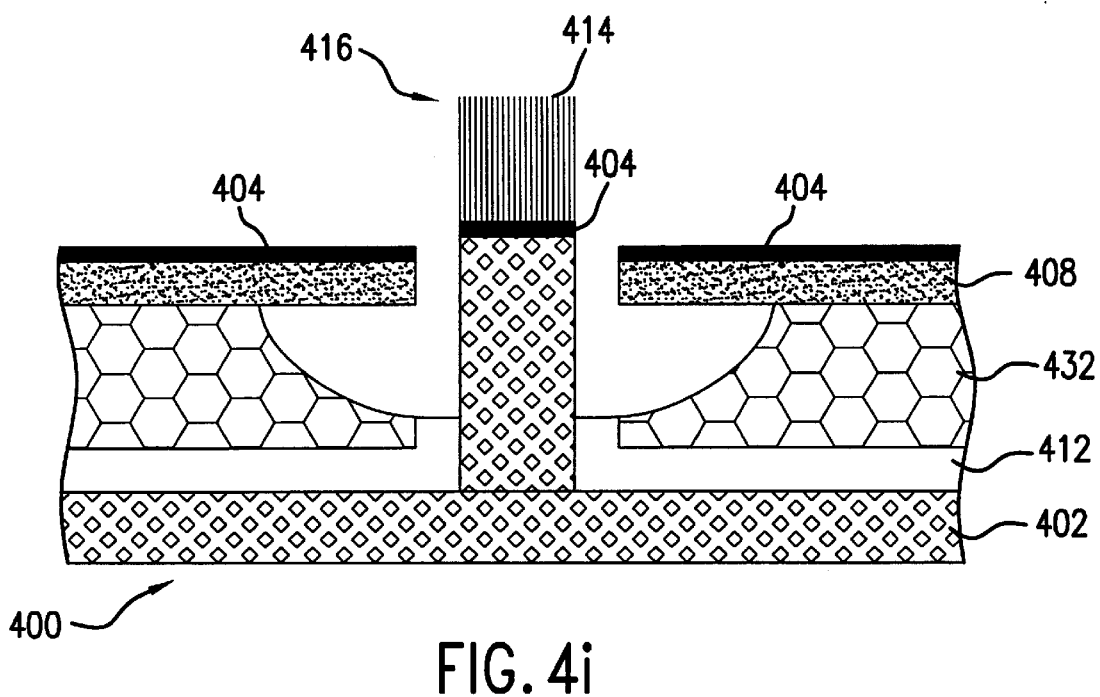

Nanofilaments 414, preferably carbon nanotubes, are grown on top of post 430 under similar conditions as set forth in the previous embodiments, resulting in clump cathode 416 (see FIG. 4(i)).

One advantage of the fourth embodiment is that the nanofilament 414 placement can be above gate layer 408. Consequently, there is less of a chance that there will be a short between nanofilaments 114 and gate layer 408.

5th Embodiment

FIGS. 5(a)–5(d), depicted a fifth embodiment of the present invention. In this embodiment, nanofilament growth occurs on the top surface of a conventional tip-on post emitter (530) or conical tip emitter (531) known in the art. This embodiment differs from the fourth embodiment in that instead of using the blunt post structure of post 430, this embodiment uses ready-made conventional field emitter structures of sharpened tip-on-post structure or a conical tip structure upon which nanofilaments are grown. Otherwise, the processing steps of this embodiment are identical to that of the fourth embodiment.

The formation of nanofilaments along the top of tip-on post 530 and conical tip 531 occurs in the same manner as in the fourth embodiment. Specifically, a conformal silicon oxide sacrificial layer is first deposited over field emitter cells 500, 501, and then selectively removed by directional RIE from the top surfaces of the tip-on-post 530, or conical tip 531, in a manner similar to that in the fourth embodiment. Optimally, the gate aperture 511 of the conical tip design is small as practicable and should be smaller than the diameter of the base of the conical cathode 531.

Figure 5A:
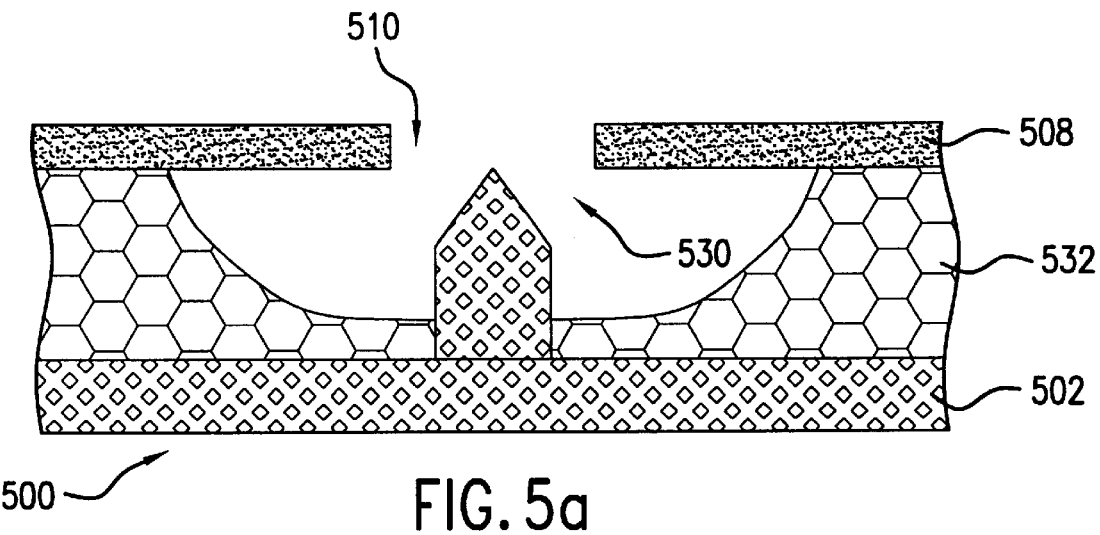
FIGS. 5(a)–5(d) illustratively depicts the processing steps in fabricating a field emitter cell according to a fifth embodiment of the present invention in which the emitter cathode is formed as a group of nanofilaments on a conical tip or a tip-on-post emitter structure.
Figure 5B:
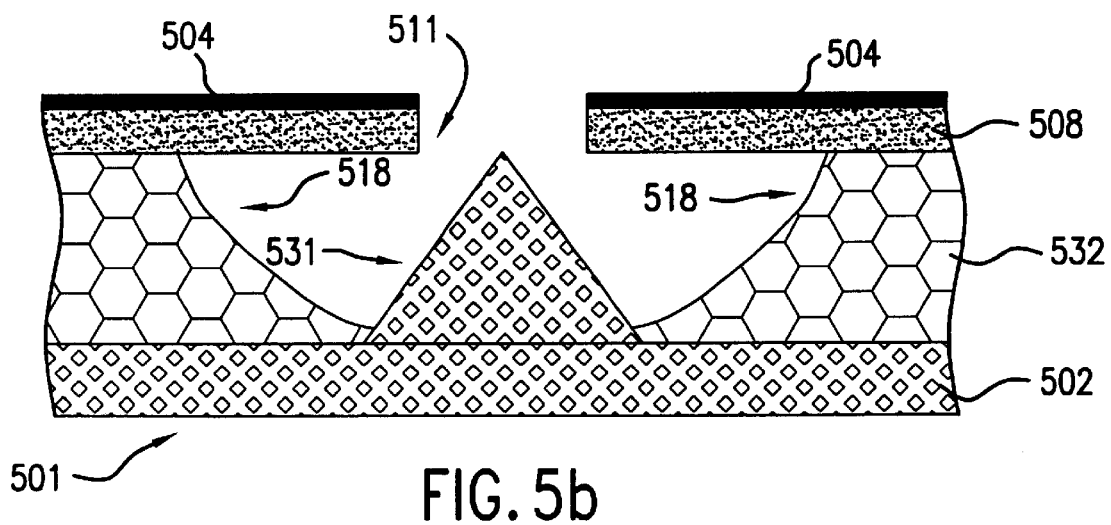
Figure 5C:
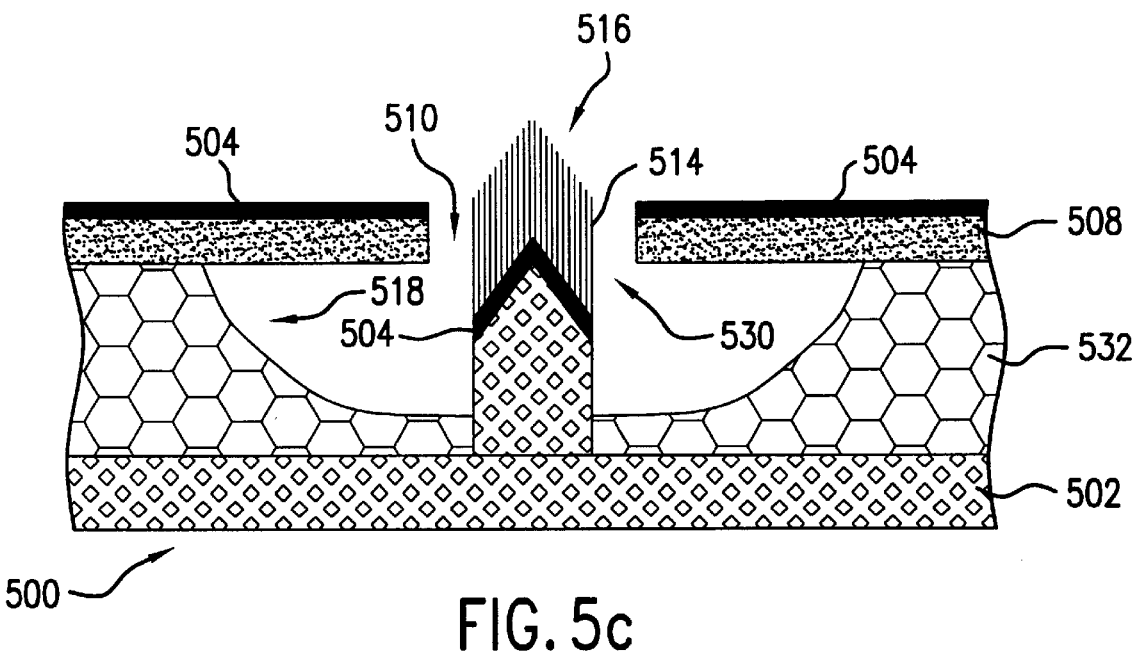
Figure 5D:
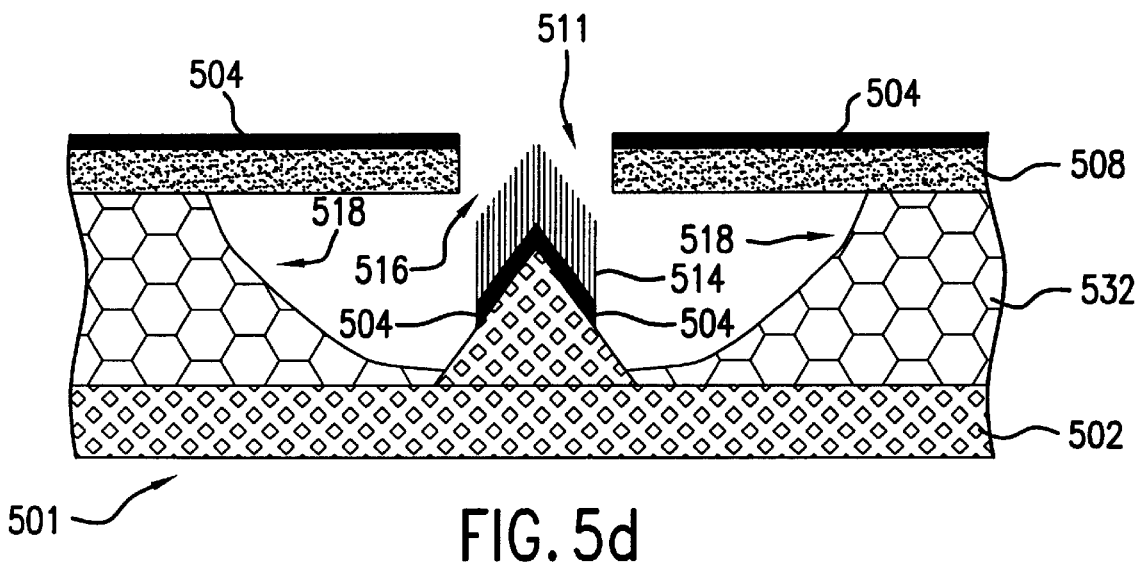

Next, a catalyst is deposited, the sample treated with hydrofluoric acid, rinsed in water, and nanofilaments are grown along the top surface of tip-on-post 530, and conical tip 531 (FIGS. 5(c) and 5(d)), in similar manner as in the fourth embodiment. As a result, clump cathode 516 is formed of nanofilaments 514 protruding outward from the surface of the centers (i.e., upper portions) of tip-on post 530 (FIG. 5(c)) and conical tip 531 (FIG. 5(d)).

The lengths of the nanofilament 514 should be limited so that the nanofilaments are relatively short and do not come into contact with other parts of the emitter (for example, the gate layer 508 or insulator 532). Preferably, the lengths of the nanofilaments should be a small fraction of the distance between the top of the original (tip-on- post or conical tip) to the edge of the gate aperture 510 and 511. Optimally, although not essential, tip-on post 530 and conical tip 531 should be of a material that does not passivate the catalyst material 504.

If the emitter tip material passivates the catalyst, the tip should be coated with a material that prevents diffusion of the catalyst material into the tip material under nanofilament growth conditions. As with the previous embodiments, it is preferable that the material of gate layer 508 does passivate the catalyst material so that no nanofilaments will grow on the gate layer 508.

If the gate material does not passivate the catalyst material, it is necessary to remove the catalyst material from the top surface and the edge of the gate. Sputtering at a glancing angle (small angle relative to the surface of the substrate) with an ion beam is one such way of removing the catalyst material. Care should be taken that the angle is such that no portion of the tip-on-post or conical tip is sputtered.

To remove catalyst material from any silicon dioxide surface (for example, on the top surface or oxide insulator surface 532 or along the shank portion of conical portion tip-on post 530), the structure may be dipped in a buffered HF solution. However, the duration should be sufficiently short such that a significant amount of catalyst 504 still remains on the surfaces of the top portions of structures 530 and 531.

Optimally, nanofilaments 514 are grown on the portion of tip on-post 530 and conical tip 531 covered with catalyst layer 504 using CVD method under lean hydrocarbon conditions (i.e., low hydrocarbon-to-reducing gas ratio) to eliminate growth of non-nanofilament carbonaceous material on insulator layer 532. The growth time should be limited so that nanofilaments 514 should be relatively short.

If necessary, a short isotropic oxygen plasma, such as in a barrel etcher, can be used to remove any thin layer of carbonatious material from insulator layer 532. If the insulator layer 532 is silicon dioxide, it can be optionally followed by a short dip in dilute buffered HF and subsequent water rinsed to ensure cleanliness of the surface of insulator 532.

Precautions should be taken to prevent any nanofilaments 504 from lying down on the tip surface due to adhesion (stiction) after exposure to an aqueous environment of HF and water rinse. As with the previous embodiments, it is optimal to use a freeze-drying or a critical-point drying technique.

An exemplary preferred implementation of the processing method of the fifth embodiment will now be considered. It will be understood that this example is provided to enhance understanding of the present invention and not to limit the scope or adaptability thereof.

The starting structures were an array of the silicon tip-on-post gated field emitter cells fabricated according to a process developed at the Microelectronic Center of North Carolina by a number of standard silicon microprocessing steps (outlined in FIG. 3 in D. Temple, et. al., J. Vac. Sci. Technol. B 13, 150 (1995) and in FIG. 2 in L. N. Yadon, et. al., J. Vac. Sci. Technol. B 13, 580 (1995)). The silicon tip-on-post emitter cell structure is schematically shown in FIG. 5(a) of the present disclosure.

The silicon post height was about 4 microns, the post diameter was about 1 micron, and the post was topped with a very small and sharp conical silicon tip. The gate aperture diameter was 2.8 microns and the gate material was made of pure chromium, which apparently could survive the relatively high temperatures and conditions used for carbon nanotube (cNT) growth in the current example. Moreover, chromium, under the cNT growth conditions used in this example, has been observed to passivate Fe and Ni catalysts (e.g. no cNT growth on Fe and Ni-coated chromium surfaces). Since the sidewalls of the tip-on-post structure had some silicon dioxide left on it from processing, it was optional to omit the initial deposition of a conformal sacrificial silicon dioxide layer. In this example, the initial conformal silicon dioxide sacrificial layer had been omitted.

Next, a very thin layer of nickel catalyst was sputter-deposited on the substrate using an ion beam and a nickel foil as sputtering target. The nickel coated the surfaces of the chromium gate, the top surface of the tip-on-post (including the small silicon tip), and likely residually other surfaces in the emitter cell cavity. The sample was then briefly dipped in a dilute buffered HF solution and thoroughly rinsed (by weak ultrasonication) in distilled water. The HF removed much (by lift-off) much of the residual nickel that happened to be on any silicon dioxide surfaces in the emitter cell cavity. After drying by blowing with nitrogen and mild heating on a hot plate, the sample was placed on the flat top of a molybdenum cartridge heater in a hot filament chemical vapor deposition (CVD) flow reactor, in which the hot filament consisted of a tungsten ribbon suspended parallel to and about a centimeter above the sample. The cartridge heater and the tungsten filament were heated separately. The temperature was measured by a thermocouple in contact with the top surface of the cartridge heater. The gas flow was perpendicular to the surface of the sample.

Growth of the carbon nanotube emitters began by first heating the sample in flowing argon at a pressure of about 20 torr until a temperature of about 700° C. was reached, at which ammonia gas at a flow rate of 80 sccm replaced the argon and flowed onto the sample. The hot filament was immediately turned on and maintained at a filament temperature of about 1900° C. as monitored by an optical pyrometer. Five minutes after turning on the hot filament, ethylene gas at a flow speed of 20 sccm was admitted into the flow reactor. The final temperature and pressure were maintained at 683° C. and 23.3 torr, respectively. The hot filament, the ethylene gas, and ammonia gas were shut off 4.5 minutes after the admission of the ethylene gas. Argon at about 25 torr was then flowed as the sample was cooled down slowly.

Scanning electron microscope examination showed carbon nanotubes on the top surface of the tip-on post cathode structure and no carbon nanotubes on the chromium gate.

Figure 5E:
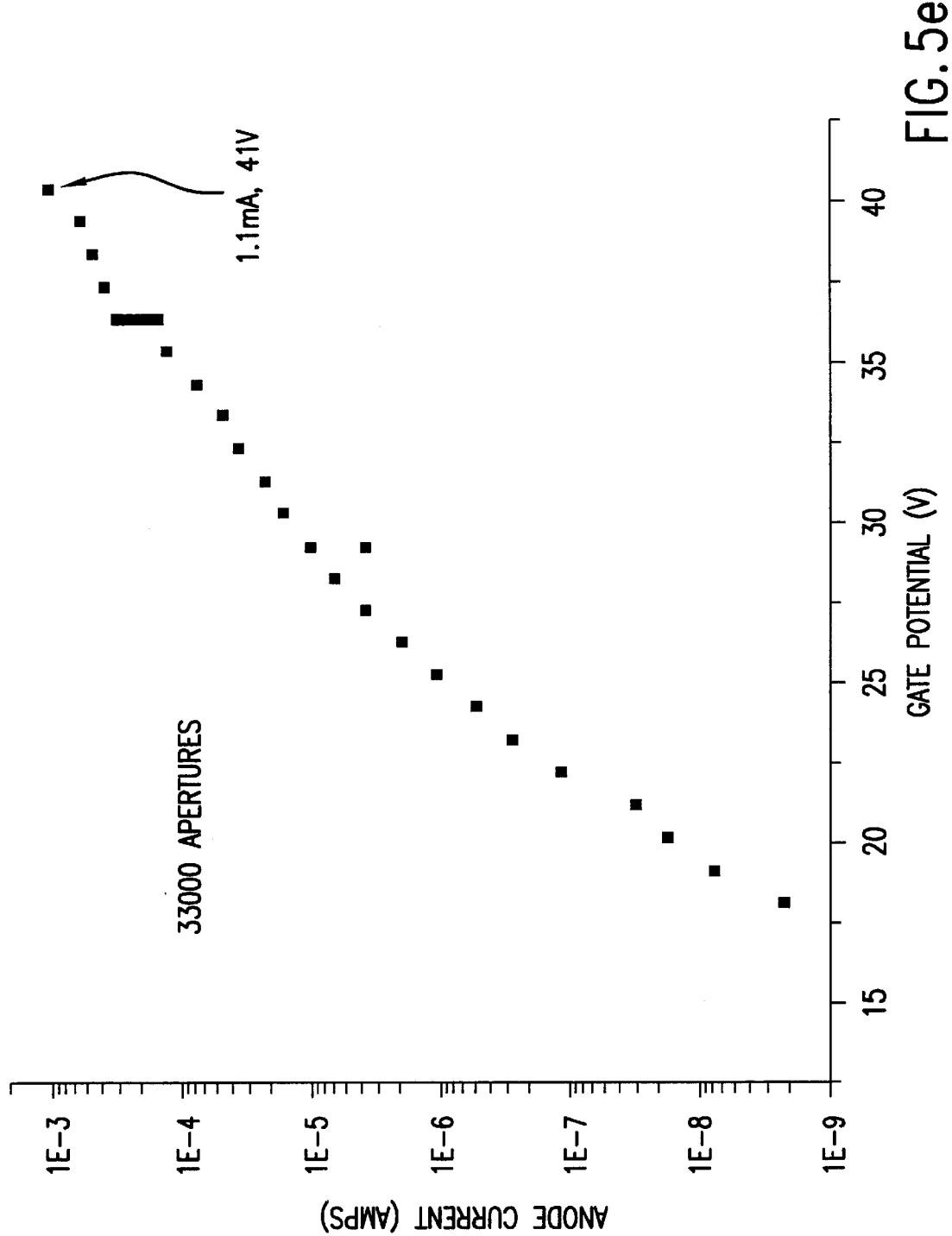
FIG. 5(e) is a plot of the resulting field emission data of the fifth embodiment.

The sample was subjected to field emission test in an ultra-high vacuum chamber equipped with electrically conductive cathode, gate, and anode probes to provide electrical contact to the individual pixels (arrays) of the field emitter and to measure the current of the field-emitted electrons. For a pixel consisting of 33,000 emitter cells, the collected emission current (anode current) was measured as a function of the voltage applied to the gate electrode (with the cathode at ground). The results are shown in FIG. 5(e).

An important result is the low turn on voltage (e.g. ~17 volts) compared to about 80 volts obtained for an array of silicon tip-on post FEA (without the nanotubes). The result for the latter sample is consistent with the 80–90 volts required by the silicon tip-on post structures in references by D. Temple, et. al., and L. N. Yadon, et. al. (above mentioned). This low turn-on voltage for the present nanotube-decorated example can be attributed to the carbon nanotubes acting as field emitters.

There can be a wide latitude on the growth parameters, such as different catalysts (e.g. Fe, Co), temperatures (500–1000° C.), hydrocarbons (e.g. methane, acetylene), reducing agents (hydrogen), flow rates, pressures, and even a variety of growth techniques including thermal, microwave, and RF CVD methods as well as arc and laser-assisted catalytic growth methods. In a CVD method, a low hydrocarbon-to-reducing agent ratio is necessary to minimize amorphous carbon deposition on catalyst-free surfaces, to avoid electrically shorting out the emitter cell (between cathode and gate).

6th Embodiment

Figure 6A:
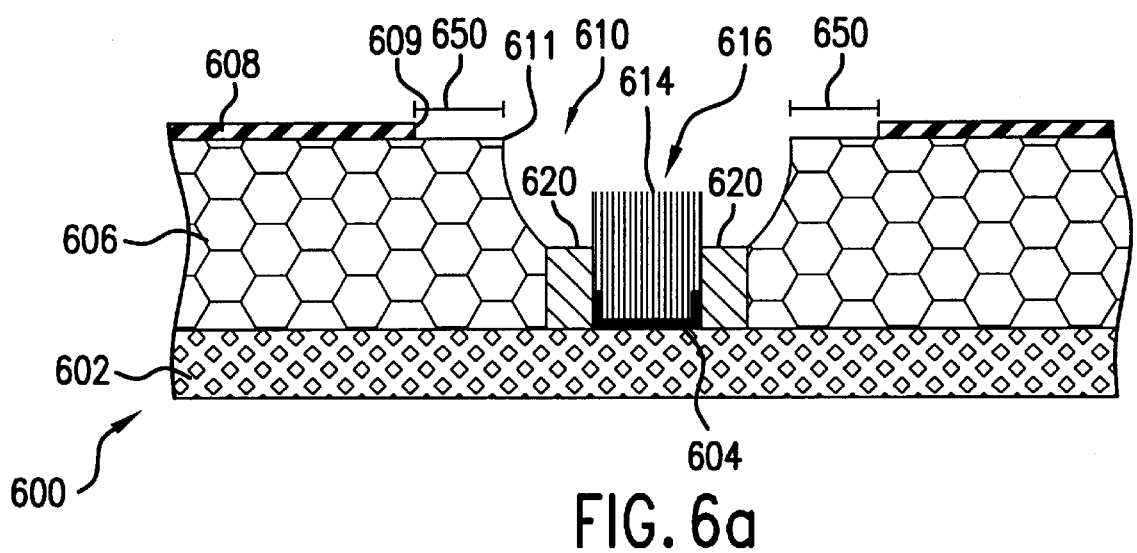
FIG. 6(a) illustratively depicts a sixth embodiment of a field emitter using a group of nanofilaments as the emitter cathode with an offset control gate according to the present invention.

In a sixth embodiment, the control gate is formed as offset gate aperture 609 in which the gate aperture is offset by distance 650 from the edge of the aperture 611 in insulator layer 606 (see FIG. 6(a). The offset of a gate aperture from that of the insulator layer has previously been described in patent application Ser. No. 09/478,899 filed on Jan. 7, 2000, herein incorporated by reference.

The sixth embodiment is based on the second embodiment. All processing steps are the same as those in the second embodiment except that the starting cell structure has an off-set gate aperture. A similar offset of gate aperture 609 from the insulator aperture 611 formed therebelow may also be incorporated into the other embodiments. Likewise, other embodiments of gate offset in patent application Ser. No. 09/478,899 are also incorporated into the present embodiment and other embodiments of the present invention as applicable. One possible advantage of having an offset gate layer is to reduce the gate current by precluding a direct-line-of sight from the nanofilament emitter to the gate.

An exemplary preferred implementation of the processing method of the sixth embodiment will now be considered. It should be understood that this example is provided to enhance understanding of the present invention and not to limit the scope or adaptability thereof.

The starting structure was similar to that shown in FIG. 2(a), except that the gate was offset (having a larger diameter than that of the hole in the insulator layer). The methods for fabricating starting structures with offset gates were also given in a commonly-owned patent application (patent application Ser. No. 09/478,899). The gate material consisted of a 60 nm thick chromium layer on top of a 150 nm thick p-type silicon layer. The hole in the insulator layer had a diameter of 1.2 microns and the gate diameter was 2.25 microns (e.g. the offset was about 0.5 micron). A stand-off CVD silicon dioxide layer (nominally 0.42 micron thick on top flat surface) was then deposited over the structure, followed by oxide etch back by RIE of 0.45 micron of silicon dioxide. SEM analysis showed a 0.32 micron thick stand-off layer on the vertical sidewall of the hole, leaving an open, inner hole of about 570 nm diameter.

A thin layer of Fe was then deposited over the sample using an ion beam and a Fe foil as sputtering target. Next, a 0.25 micron thick Shipley 1400 photoresist was spin-coated over the sample, followed by baking at 90° C. for 30 minutes. Oxygen plasma using a barrel etcher was used to remove the resist from the top horizontal surface and from the upper portion of the hole. The exposed Fe was removed by dipping the sample in an acid solution. After rinsing in water and drying, the sample was ultrasonicated in acetone, followed by ethanol to remove the resist from the bottom portion of the hole, thereby exposing the Fe catalyst on the bottom portion of the hole.

The growth of the carbon nanotube emitters was carried out under similar conditions as described above in reference to the exemplary implementation of the fifth embodiment, except a DC voltage bias was placed on the hot filament with respect to the top surface of the cartridge heater and that a growth duration of only 40 seconds was used. The purpose of the voltage bias was to promote more oriented growth of the carbon nanotubes.

Figure 6B:
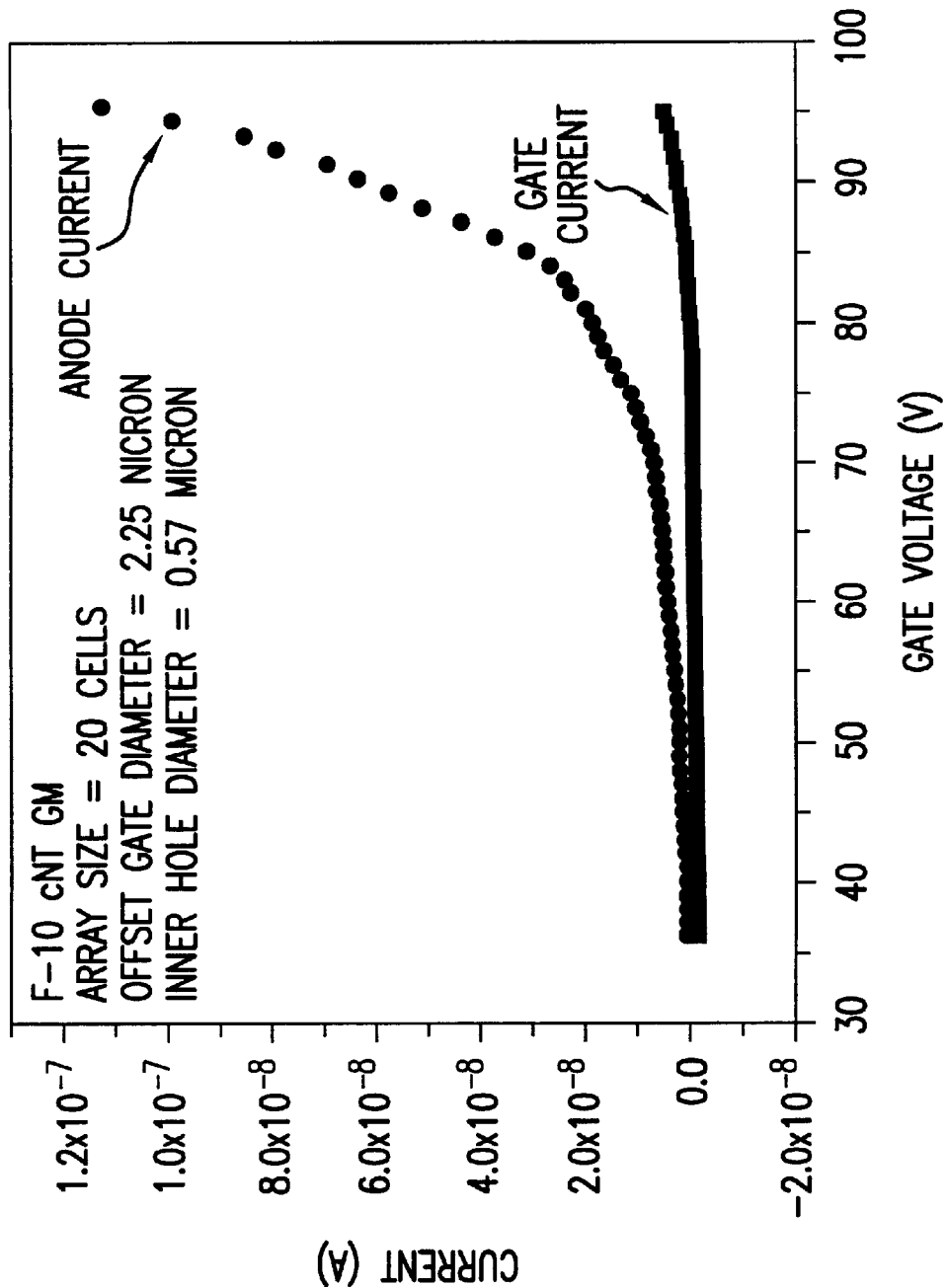
FIG. 6(b) is a plot of the field emission data of the sixth embodiment.
Figure 7A:
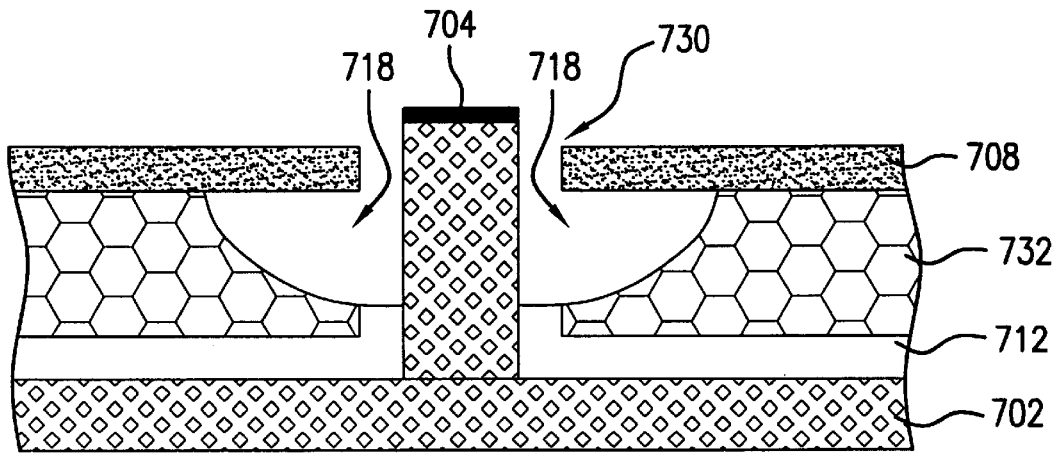
Figure 7B:
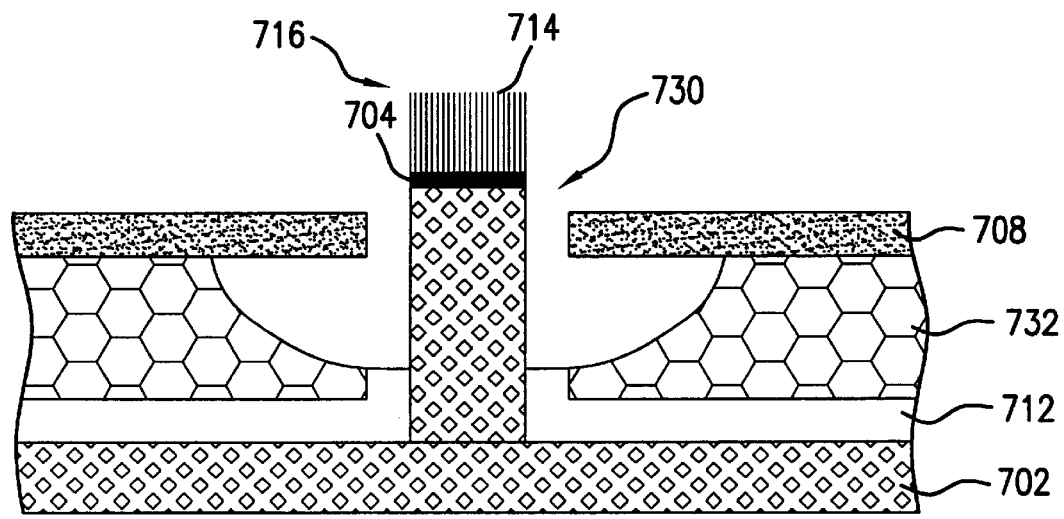

Field emission test was carried out on a small pixel of an array of 20 emitter cells. The anode current and the gate current were measured simultaneously as a function of the voltage applied to the gate electrode. The results are shown in FIG. 6(b). A turn-on voltage below 35 volt was observed. FIG. 6(b) also shows that the gate current is a very small fraction of the anode current, a result expected from an offset gate design. An offset gate can also be expected to require a higher turn-on voltage than one without an offset.

Alternative photoresist etching could be done by oxygen reactive ion etching (which is anisotropic) instead of by the oxygen barrel etcher (which is isotropic), thereby gaining better control over the portion of resist to be removed.

Although the invention has been described above in relation to preferred embodiments thereof, it should be understood by those skilled in the art that variations and modifications can be effected in these preferred embodiments without departing from the scope and spirit of the invention.

What is claimed is:

1. A field emitter cell comprising:
   an electrically conductive substrate layer;
   an insulator layer formed on a surface conductively associated with said substrate layer, said insulator layer having a first aperture therethrough, said aperture defined by a sidewall and a bottom surface, said bottom surface conductively associated with said substrate layer;
   an electrically conductive gate layer disposed on said insulator layer thereby forming an electrically conductive gate, said electrically conductive gate having a second aperture;
   a catalyst layer conductively associated with said substrate layer; and
   an electrically conductive group of nanofilaments grown upon said catalyst layer and conductively associated with said substrate layer, said group of nanofilaments being electrically isolated from said gate, said gate and said group of nanofilaments being self-aligned with one another.

2. The field emitter cell of claim 1, wherein said catalyst layer is formed directly on said substrate layer.

3. The field emitter cell of claim 1, wherein said surface upon which said insulator layer is formed comprises an upper surface of said substrate layer.

4. The field emitter cell of claim 1, wherein said surface upon which said insulator layer is formed comprises an upper surface of said catalyst layer.

5. The field emitter cell of claim 1, wherein said nanofilaments comprises carbon nanotubes.

6. The field emitter cell of claim 1, wherein said nanofilaments comprises nanowires composed of material selected from the group consisting of doped or undoped Si, Ge, SiC, GaAs, GaP, InAs, InP, ZnS, ZnSe, CdS, CdSe, $MoS_2$, $WS_2$, and combinations thereof.

7. The field emitter cell of claim 1, wherein said gate layer is a passivating gate material upon which a predeposited catalyst material does not catalyze growth of nanofilaments under nanofilament growth conditions.

8. The field emitter cell of claim 1, wherein said gate layer is a passivating gate material selected from the group consisting of Cr, W, Pt, Ta, Mo, and combinations thereof.

9. The field emitter cell of claim 1, further comprising a vacuum gap separating said nanofilaments from said gate.

10. The field emitter cell of claim 1, further comprising a stand-off layer disposed between said group of nanofilaments and said sidewall of said insulator layer.

11. The field emitter cell of claim 10, wherein said stand-off layer is insulating and is either recessed or not recessed.

12. The field emitter cell of claim 10, wherein said stand-off layer is conducting and is recessed.

13. The field emitter cell of claim 1, wherein said group of nanofilaments form a cathode.

14. The field emitter cell of claim 1, wherein said gate is integrally formed, wherein at least one aspect of the geometry or placement of either the group of nanofilaments or the gate is manipulated to determine the geometry or placement of the other, relative to each other.

15. The field emitter cell of claim 1, further comprising a post-structure extending from a substrate surface, and upon which said catalyst layer is formed, and wherein said gate, said post-structure, and said group of nanofilaments are self-aligned with one another.

16. The field emitter cell of claim 15, wherein said post-structure is tapered on an end forming a conical tip opposite said substrate layer and said catalyst layer is formed on said end of said post-structure opposite said substrate layer.

17. The field emitter cell of claim 16, wherein said gate, said post structure, and said group of nanofilaments are self-aligned with one another.

18. The field emitter cell of claim 1, further comprising a conical tip structure extending from a substrate surface and upon which said catalyst layer is formed.

19. The field emitter cell of claim 18, wherein said gate, said tip structure, and said group of nanofilaments are self-aligned with one another.

20. The field emitter cell of claim 1, wherein said second aperture is coincident with said first aperture.

21. The field emitter cell of claim 1, wherein said gate aperture is offset from said first aperture, said gate aperture being greater than said first aperture.

22. The field emitter cell of claim 1, wherein size of said gate aperture is smaller, equivalent, or larger than said first aperture in said insulator layer, and said gate aperture having a standoff insulator layer shielding the gate layer to preclude a direct line-of-sight from nanofilament emitter.

23. The field emitter cell of claim 1, wherein said first aperture and said gate aperture have a geometric shape selected from the group consisting of circular, linear, square, rectangular, and polygonal.

24. The field emitter cell of claim 1, wherein said nanofilament emitter has a sufficient resistance that, during emission, limits the current of the emitter by causing an IR drop in the potential between the gate and the emitter.

25. The field emitter cell of claim 1, wherein said gate layer is a multiple layer structure comprising at least one conducting layer.

26. The field emitter cell of claim 1, wherein said gate layer comprises a p-type semiconductor.

27. The field emitter cell of claim 1, wherein said catalyst layer is formed upon a porous silicon layer, said catalyst layer and said porous silicon layer being conductively associated with each other and with said substrate layer.

28. A field emitter cell comprising:

an electrically conductive substrate layer;

an insulator layer formed on a surface conductively associated with said substrate layer, said insulator layer having a first aperture therethrough, said aperture defined by a sidewall and a bottom surface, said bottom surface conductively associated with said substrate layer;

an electrically conductive gate layer disposed on said insulator layer thereby forming an electrically conductive gate, said electrically conductive gate having a second aperture;

a catalyst layer conductively associated with said substrate layer; and an electrically conductive group of nanofilaments grown upon said catalyst layer and conductively associated with said substrate layer, said group of nanofilaments being electrically isolated from said gate.

* * * * *